United States Patent
Ho et al.

(10) Patent No.: US 8,303,449 B2
(45) Date of Patent: Nov. 6, 2012

(54) AUTOMATIC TRANSMISSION FOR A POWER TOOL

(75) Inventors: Chi Hong Ho, Kwai Chung (HK); Ka Ki Chan, Kowloon (HK); Wing Fung Yip, Kowloon (HK)

(73) Assignee: Techtronic Power Tools Technology Limited, Tortola (VG)

( * ) Notice: Subject to any disclaimer, the term of this patent is extended or adjusted under 35 U.S.C. 154(b) by 910 days.

(21) Appl. No.: 12/336,075

(22) Filed: Dec. 16, 2008

(65) Prior Publication Data
US 2009/0098971 A1   Apr. 16, 2009

Related U.S. Application Data

(63) Continuation-in-part of application No. 11/497,621, filed on Aug. 1, 2006, now Pat. No. 7,513,845.

(51) Int. Cl.
| | |
|---|---|
| H02P 7/00 | (2006.01) |
| H02P 29/04 | (2006.01) |
| H02K 17/32 | (2006.01) |
| H02K 23/68 | (2006.01) |
| H02K 27/30 | (2006.01) |
| F16H 48/06 | (2006.01) |
| F16H 3/44 | (2006.01) |

(52) U.S. Cl. ........ 475/153; 475/299; 173/176; 318/432; 318/433

(58) Field of Classification Search .................. 475/153, 475/299; 173/176; 318/430, 432, 433
See application file for complete search history.

(56) References Cited

U.S. PATENT DOCUMENTS

| | | |
|---|---|---|
| 3,257,877 A | 6/1966 | Ulrich et al. |
| 3,430,521 A | 3/1969 | Kulman |
| 4,215,594 A | 8/1980 | Workman, Jr. et al. |
| 4,641,551 A | 2/1987 | Pascaloff |
| 4,648,756 A | 3/1987 | Alexander et al. |
| 4,650,007 A | 3/1987 | Fujita et al. |
| 4,834,192 A | 5/1989 | Hansson |
| 4,854,786 A | 8/1989 | Alexander et al. |
| 4,869,131 A | 9/1989 | Ohmori |
| 4,869,139 A | 9/1989 | Gotman |
| 4,892,013 A | 1/1990 | Satoh |

(Continued)

FOREIGN PATENT DOCUMENTS
DE   19531043   2/1996
(Continued)

OTHER PUBLICATIONS

European Patent Application No. 07252304.6 Office Action dated Nov. 12, 2009 (6 pages).

(Continued)

*Primary Examiner* — Tisha Lewis
(74) *Attorney, Agent, or Firm* — Michael Best & Friedrich LLP

(57) ABSTRACT

A transmission assembly is powered by an electric motor and includes a transmission having an outer ring gear, a connector moveable relative to the outer ring gear between a first position, in which the connector is rotatable with the transmission in response to torque received from the motor, and a second position, in which the connector and the outer ring gear are non-rotatable, and a control mechanism operable to detect the operating current of the motor and compare the operating current to a threshold current. The control mechanism is operable to move the connector from the first position to the second position in response to the motor operating current exceeding the threshold current.

24 Claims, 29 Drawing Sheets

U.S. PATENT DOCUMENTS

| | | | |
|---|---|---|---|
| 4,898,249 A | 2/1990 | Ohmori | |
| 4,966,057 A | 10/1990 | Koppatsch | |
| 5,019,023 A | 5/1991 | Kurosawa | |
| 5,083,990 A | 1/1992 | Rahm | |
| 5,399,129 A | 3/1995 | Ciolli | |
| 5,573,472 A | 11/1996 | Ciolli | |
| 5,711,739 A | 1/1998 | Hashimoto et al. | |
| 5,731,673 A * | 3/1998 | Gilmore | 318/432 |
| 5,816,121 A * | 10/1998 | Yoshimizu et al. | 81/469 |
| 5,816,212 A | 10/1998 | Lindquist et al. | |
| 5,897,454 A | 4/1999 | Cannaliato | |
| 5,967,934 A | 10/1999 | Ishida et al. | |
| 6,165,096 A | 12/2000 | Seith | |
| 6,273,200 B1 | 8/2001 | Smith et al. | |
| RE37,905 E | 11/2002 | Bourner et al. | |
| 6,518,719 B1 * | 2/2003 | Suzuki et al. | 318/430 |
| 6,655,470 B1 | 12/2003 | Chen | |
| 6,676,557 B2 | 1/2004 | Milbourne et al. | |
| 6,796,921 B1 | 9/2004 | Buck et al. | |
| 6,824,491 B2 | 11/2004 | Chen | |
| 6,857,983 B2 | 2/2005 | Milbourne et al. | |
| 6,892,611 B2 | 5/2005 | Sasaki | |
| 7,452,304 B2 | 11/2008 | Hagan et al. | |
| 7,513,845 B2 | 4/2009 | Ho | |

FOREIGN PATENT DOCUMENTS

| | | |
|---|---|---|
| DE | 102004001252 | 9/2004 |
| EP | 0281775 | 9/1988 |
| EP | 0302229 | 2/1989 |
| EP | 0302244 | 2/1989 |
| EP | 0787931 | 8/1997 |
| EP | 1092896 | 4/2001 |
| EP | 1632312 A2 | 3/2006 |
| EP | 1884318 A | 2/2008 |
| EP | 2030710 A2 | 3/2009 |
| GB | 2193767 | 2/1988 |
| JP | 6434678 | 2/1989 |
| JP | 6202506 | 7/1994 |
| JP | 7100844 | 4/1995 |
| JP | 868446 | 3/1996 |
| JP | 8296706 | 11/1996 |
| JP | 9057640 A | 3/1997 |
| WO | 8703523 | 6/1987 |
| WO | 2007025322 A1 | 3/2007 |

OTHER PUBLICATIONS

EP09252325.7 Search Report dated May 24, 2011 (16 pages).

* cited by examiner

AUTOMATIC TRANSMISSION FOR A POWER TOOL

CROSS-REFERENCE TO RELATED APPLICATIONS

This application is a continuation-in-part of U.S. patent application Ser. No. 11/497,621 filed on Aug. 1, 2006, the entire content of which is incorporated herein by reference.

BACKGROUND

The present invention relates to power tools, and more particularly to power tool transmissions.

Power tool transmissions are often user-configurable to provide different speed outputs of the power tool. For example, an operator of a multi-speed drill may configure the drill for high-speed operation or low-speed operation by actuating a switch on the drill.

SUMMARY OF THE INVENTION

The present invention provides, in one aspect, a transmission assembly powered by an electric motor and including a transmission having an outer ring gear, a connector moveable relative to the outer ring gear between a first position, in which the connector is rotatable with the transmission in response to torque received from the motor, and a second position, in which the connector and the outer ring gear are non-rotatable, and a control mechanism operable to detect the operating current of the motor and compare the operating current to a threshold current. The control mechanism is operable to move the connector from the first position to the second position in response to the motor operating current exceeding the threshold current. Therefore, the transmission provides a high-speed, low-torque output during an initial stage of the power tool task and a low-speed, high-torque output during a final stage of the power tool task.

The present invention provides, in another aspect, a transmission assembly powered by an electric motor and including a transmission operable to receive torque from the motor, and a control mechanism coupled to the transmission and operable to detect the operating current of the motor and compare the operating current to a threshold current. The control mechanism is operable in one of a first mode, in which torque multiplication does not occur through the transmission, a second mode, in which torque multiplication occurs through the transmission, and a third mode, in which torque multiplication does not occur through the transmission when the motor operating current is less than the threshold current, and in which torque multiplication occurs through the transmission when the motor operating current exceeds the threshold current.

The present invention provides, in yet another aspect, a method of operating a power tool. The method includes transferring torque from an electric motor through a transmission, detecting an operating current of the motor, comparing the motor operating current to a threshold current, and multiplying the torque received from the motor with the transmission when the motor operating current exceeds the threshold current.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Tasks typically performed by drills (e.g., drilling and screw driving) generally require a low amount of torque at the initial stage of the task and a higher amount torque at the final stage of the task. It would therefore be desirable to have a transmission capable of varying the speed and torque output of the power tool as the performed task transitions from the initial to the final stage. Such a variable speed transmission would increase the efficiency of the power tool and would also protect the motor from overload and burnout.

Figure 1:
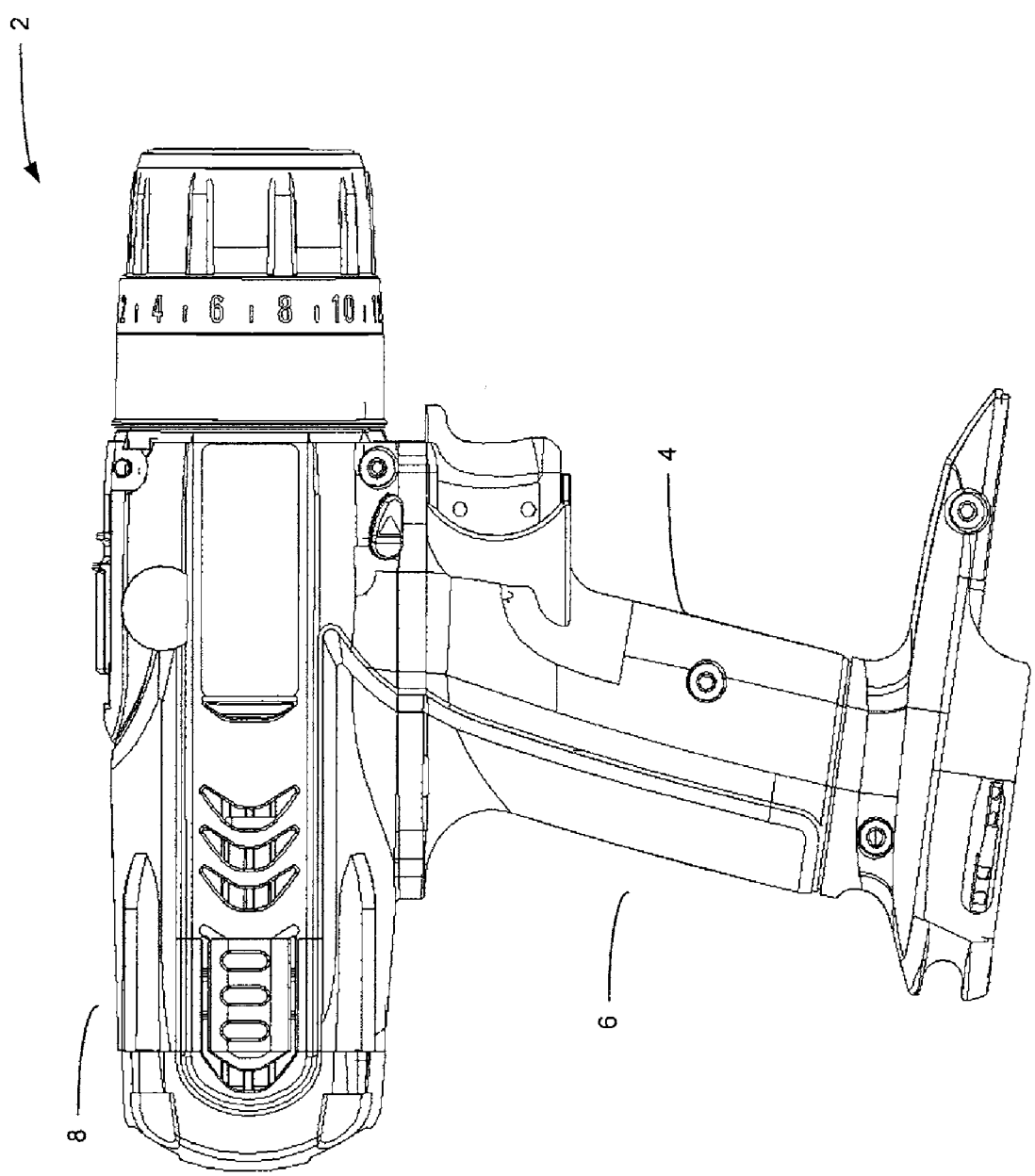
FIG. 1 is an illustration of an exemplary power tool containing a variable speed transmission.
Figure 2:
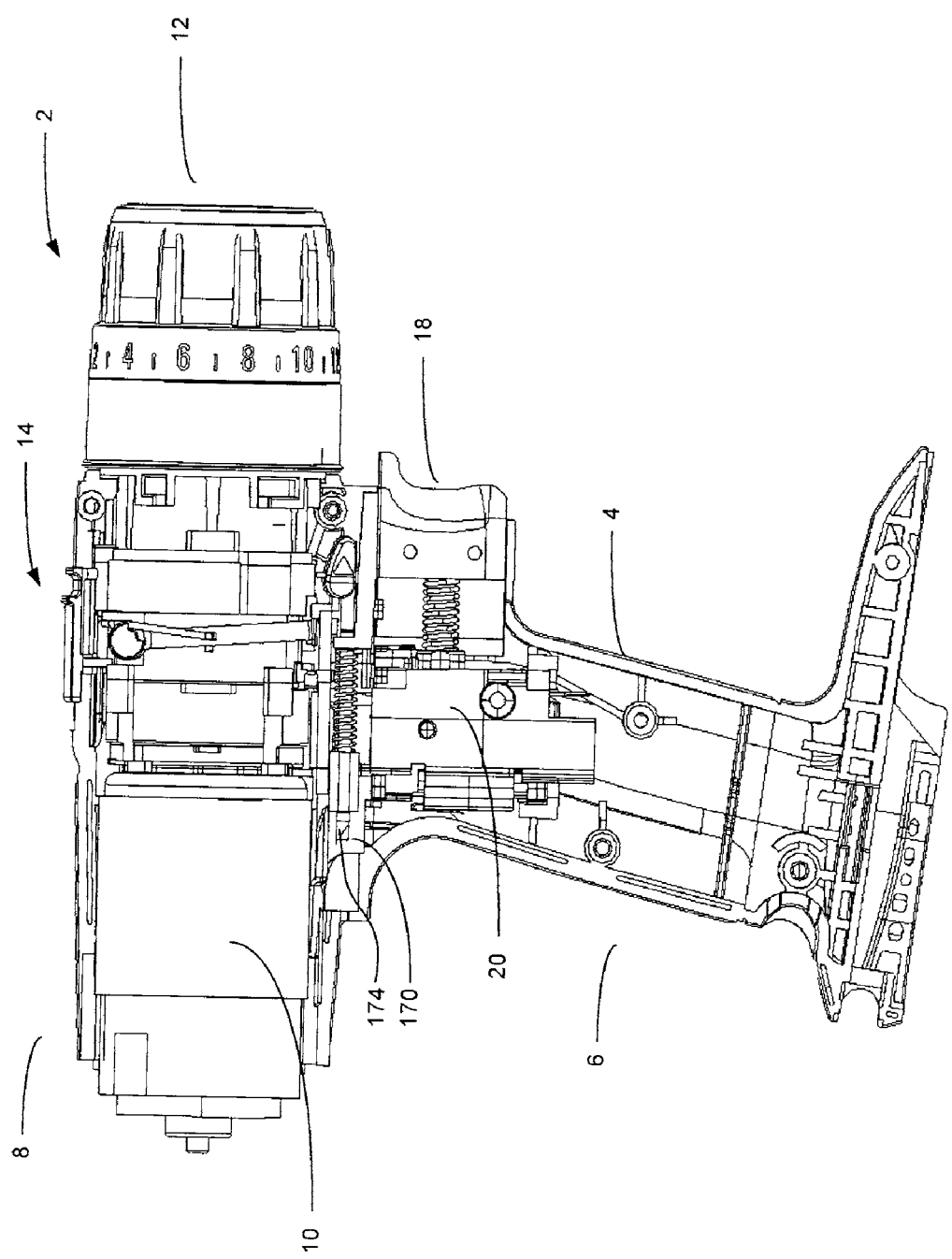
FIG. 2 is an illustration of an exemplary power tool containing a variable speed transmission with portions removed to better illustrate features of the invention.

One example of a power tool 2 that may incorporate a variable speed transmission is shown in FIG. 1. The power tool 2 may be powered from an external power source via a power chord or may be battery powered. The power tool 2 may include a power tool housing 4 that may receive the power cord or the battery pack. The power tool housing 4 may have a handle portion 6 and a drive portion 8. As shown in FIG. 2, the drive portion 8 may include a motor 10, an output 12, and a drive train 14 located intermediate the motor 10 and the output 12. The drive train 14 may include a variable speed transmission 16 (FIG. 3) to mechanically change the speed of the output 12. The power tool 2 may also include a trigger switch 18 and a motor switch 20 for selectively activating the motor 10 to supply power to the drive train 14.

Figure 3:
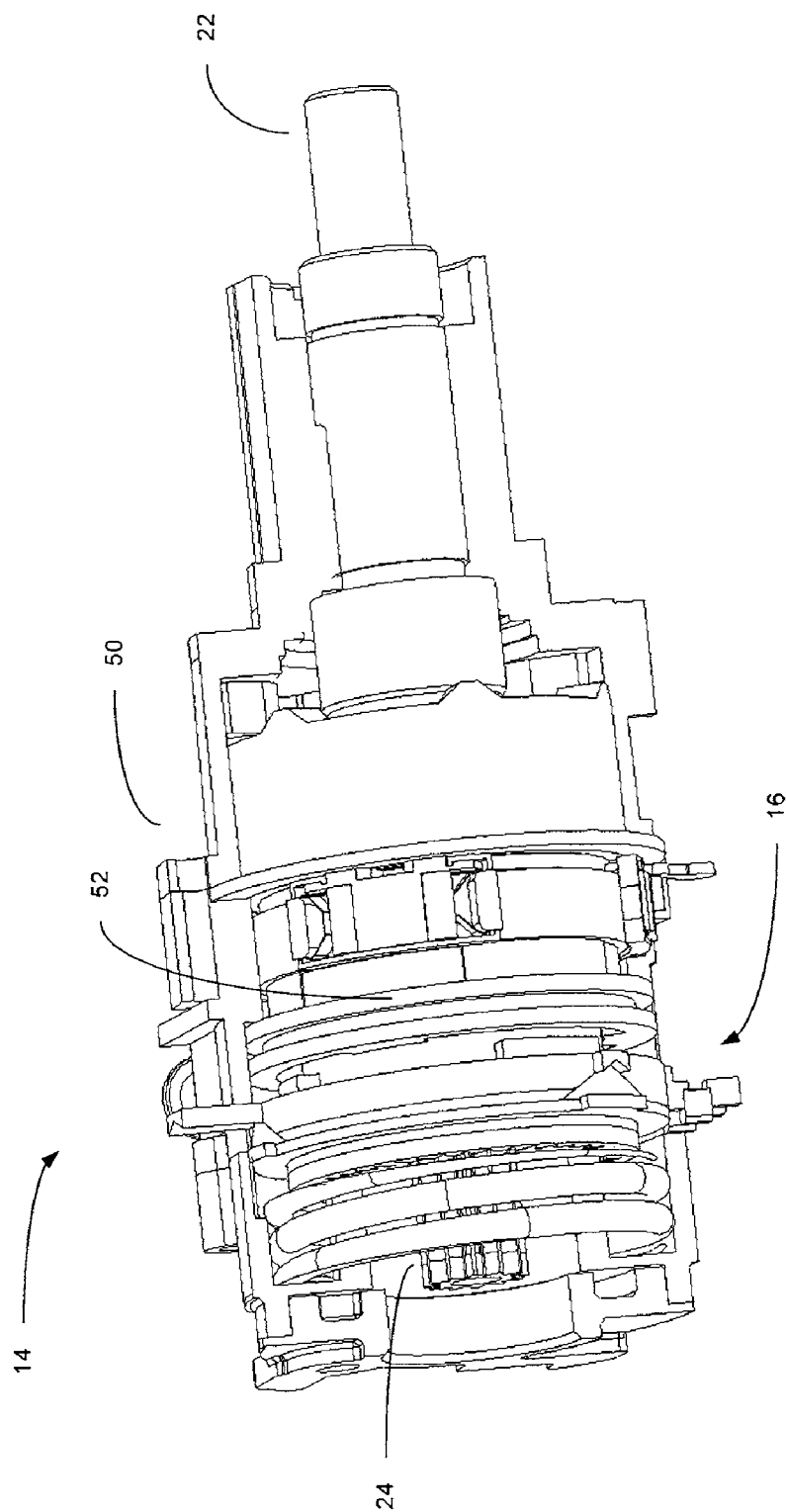
FIG. 3 is an illustration of an exemplary drive train with portions removed to better illustrate features of the invention.

An example of the drive train 14 is shown in FIG. 3. The drive train 14 includes an output spindle 22 and an input pinion 24. The output spindle 22 may be coupled to the output 12 of the power tool 2. The input pinion 24 may be coupled to the motor 10. The motor 10 may drive the input pinion 24 to rotate when the trigger switch 18 is actuated. The rotational energy from the motor 10 may be transferred from the input pinion 24 through the drive train 14 to the output spindle 22. The drive train 14 includes a variable speed transmission 16 to change the speed of rotation from the input pinion 24 to the output spindle 22 in response to a predetermined input torque.

Figure 4:
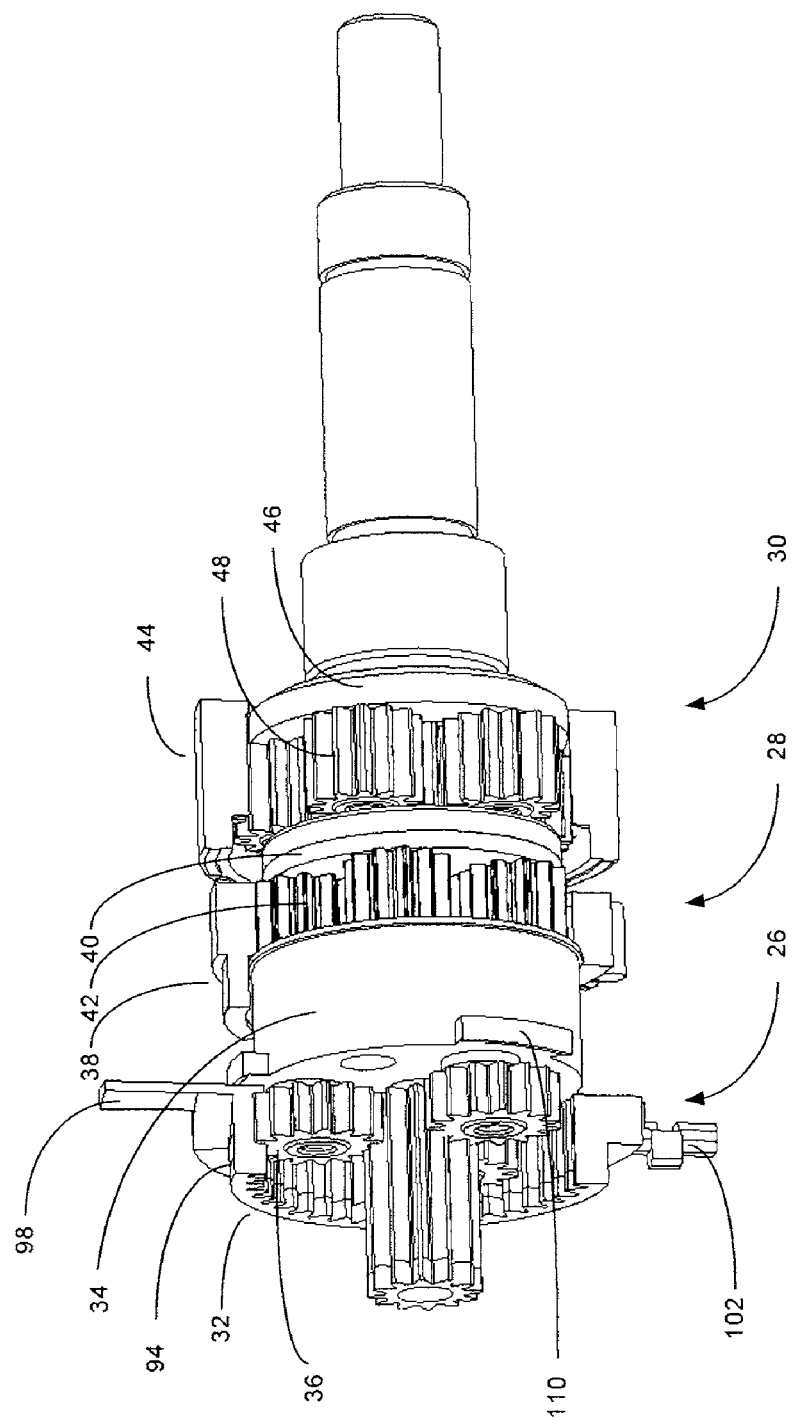
FIG. 4 is an illustration of the transmission gearing with portions removed to better illustrate features of the invention.

An example of the variable speed transmission 16 is shown in FIG. 4. The transmission 16 may include a first transmission portion 26, a second transmission portion 28, and a third transmission portion 30. The first transmission portion 26 has a first ring gear 32, a first carrier 34, and first planetary gears 36. The second transmission portion 28 has a second ring gear 38, a second carrier 40, and second planetary gears 42. The third transmission portion 30 has a third ring gear 44, a third carrier 46, and third planetary gears 48. The transmission 16 may also include a transmission housing 50 and a connector 52 that axially moves within the transmission housing 50 to change speeds of the output spindle 22 (FIG. 3).

Figure 5:
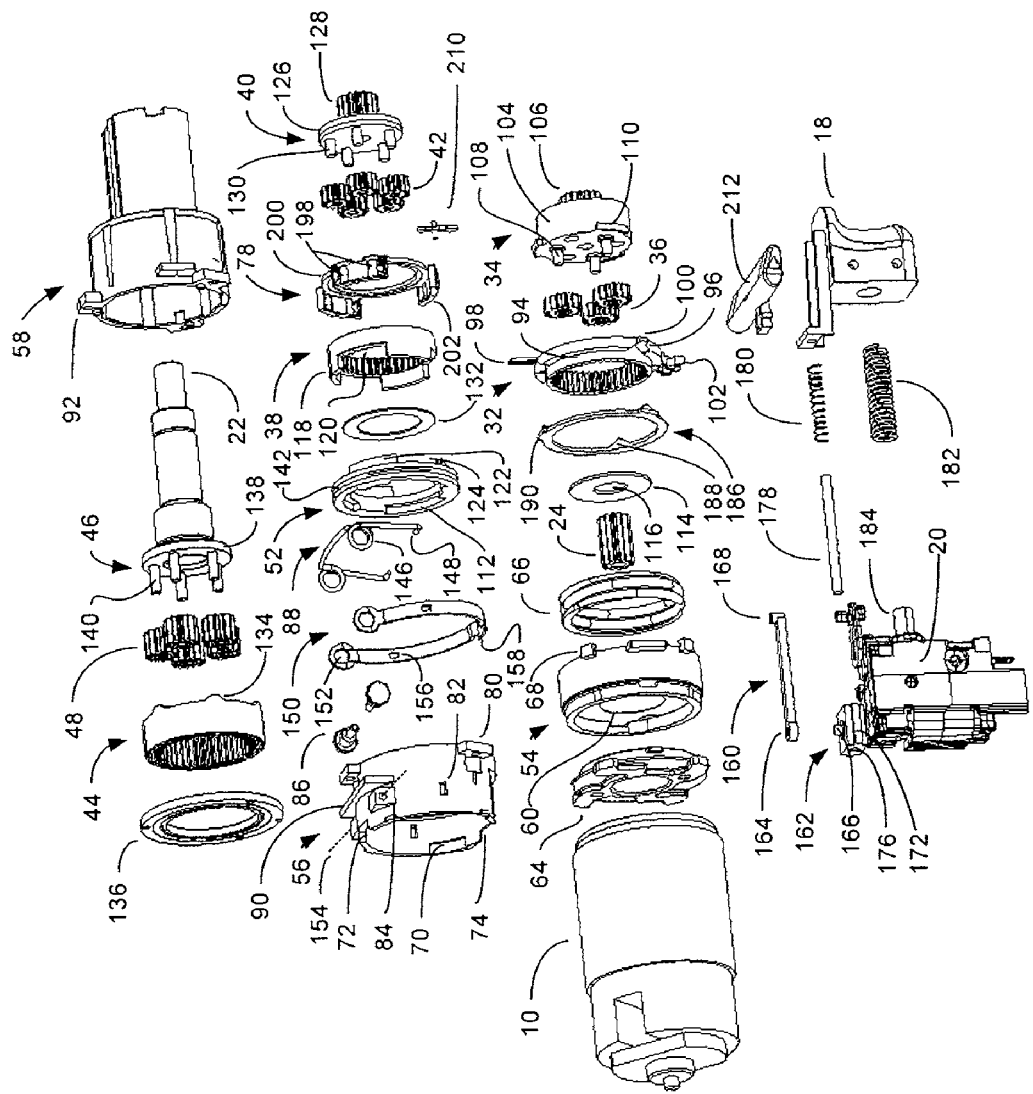
FIG. 5 is an exploded view of the transmission.
Figure 6:
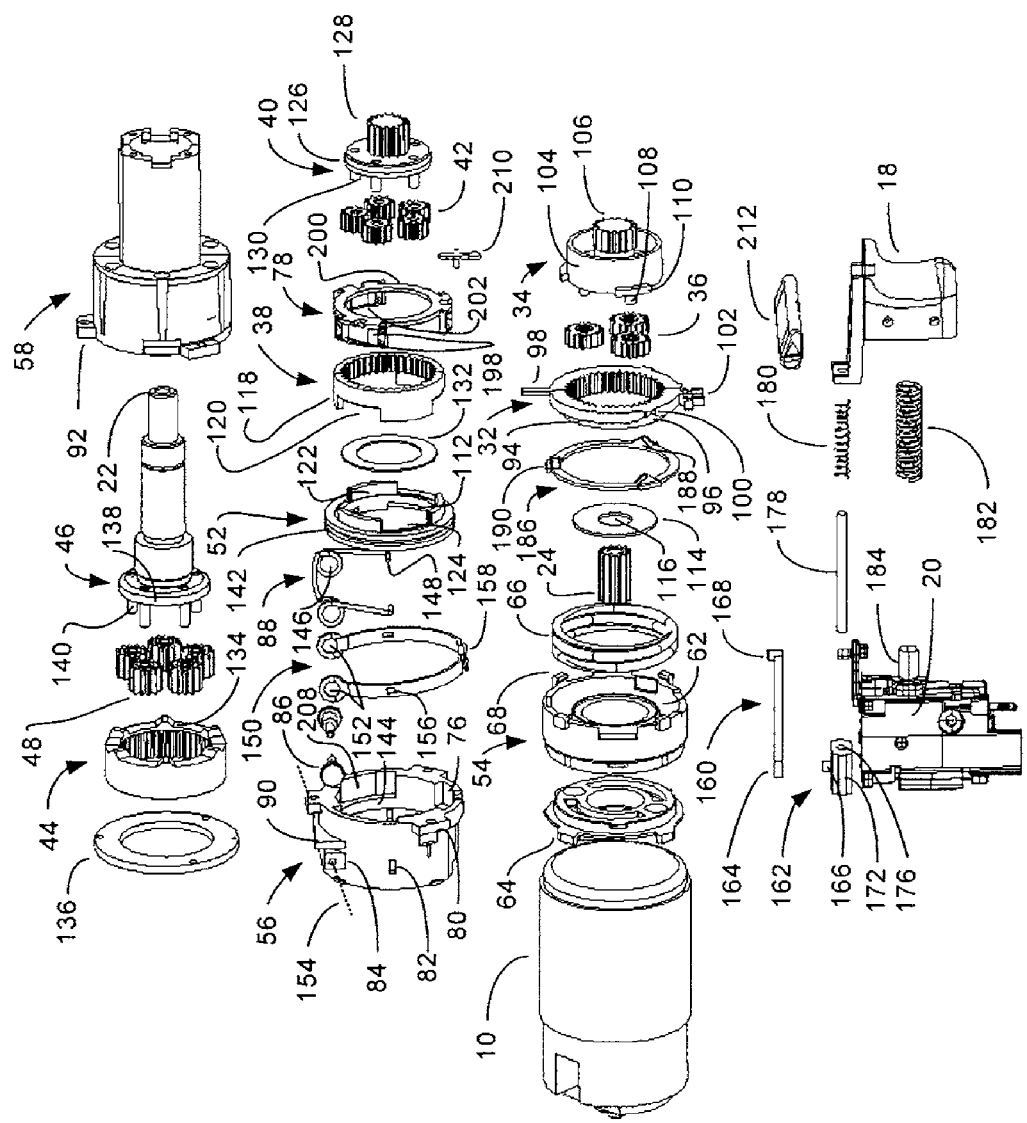
FIG. 6 is an exploded view of the transmission.

An example of the transmission housing 50 can be seen in FIGS. 5 and 6. In the example, the transmission housing 50 has a first housing portion 54, a second housing portion 56, and a third housing portion 58, although the transmission housing 50 may have any combination of housing portions including a single housing. The second housing portion 56 is coupled between the first housing portion 54 and the third housing portion 58. The first housing portion 54 is annular shaped and may form a first chamber 60 at one end and a second chamber 62 at an opposite end. The first chamber 60 may be coupled to a motor mount 64. The motor mount 64 may be coupled to the motor 10 to secure the motor 10 to the drive train 14.

The second chamber 62 may be coupled to a torque spring 66 and may provide an axial backstop to the torque spring 66. The input pinion 24, coupled at one end to the motor 10, may extend through the motor mount 64, the first housing portion 54, and the torque spring 66 and may be coupled at a second end to the first transmission portion 26. The first housing portion 54 may also have one or more clamps 68 (FIGS. 5 and 6) for coupling the first housing portion 54 to the second housing portion 56, although other known coupling methods such as screws, adhesive, or press-fitting may be used. The clamps 68 may allow for quick disassembly of the first and second housing portions 54, 56 to allow the torque spring 66 to be replaced or exchanged.

The second housing portion 56 is annular shaped and may have one or more notches 70 formed within the inner circumferential surface. The notches 70 may have an arc length extending circumferentially within the inner surface. The second housing portion 56 may also have a first gap 72 and a second gap 74 formed within the exterior surface. The gaps 72, 74 may have an arc length extending circumferentially along the exterior surface. The second housing portion 56 may also have one or more grooves 76 formed within the inner circumferential surface that may be used in association with a one-way clutch 78 as discussed below. The second housing portion 56 may also have one or more first fittings 80 located on the exterior surface. The first fittings 80 may receive a screw or other coupling mechanism to couple the second housing portion 56 to the third housing portion 58, although other known coupling methods such as clamping, adhesive, or press-fitting may be used.

The second housing portion 56 may have one or more apertures 82 formed through the exterior surface. The apertures 82 may be slot-like with the slot extending parallel to the axis of rotation of the drive train 14. The second housing portion 56 may also have one or more second fittings 84 located on the exterior surface. The second fittings 84 may receive one or more screws 86 or other coupling mechanism to couple the second housing portion 56 to a spring 88. The second housing portion 56 may also have a protrusion 90 extending from the exterior surface to axially support the spring 88.

The third housing portion 58 is annular shaped and may have one or more fittings 92 corresponding to the first fittings 80 on the second housing portion 56. The fittings 80, 92 act to couple the second and third housing portions 56, 58 together via a coupling mechanism. The output spindle 22 may extend through the third housing portion 58.

Figure 12:
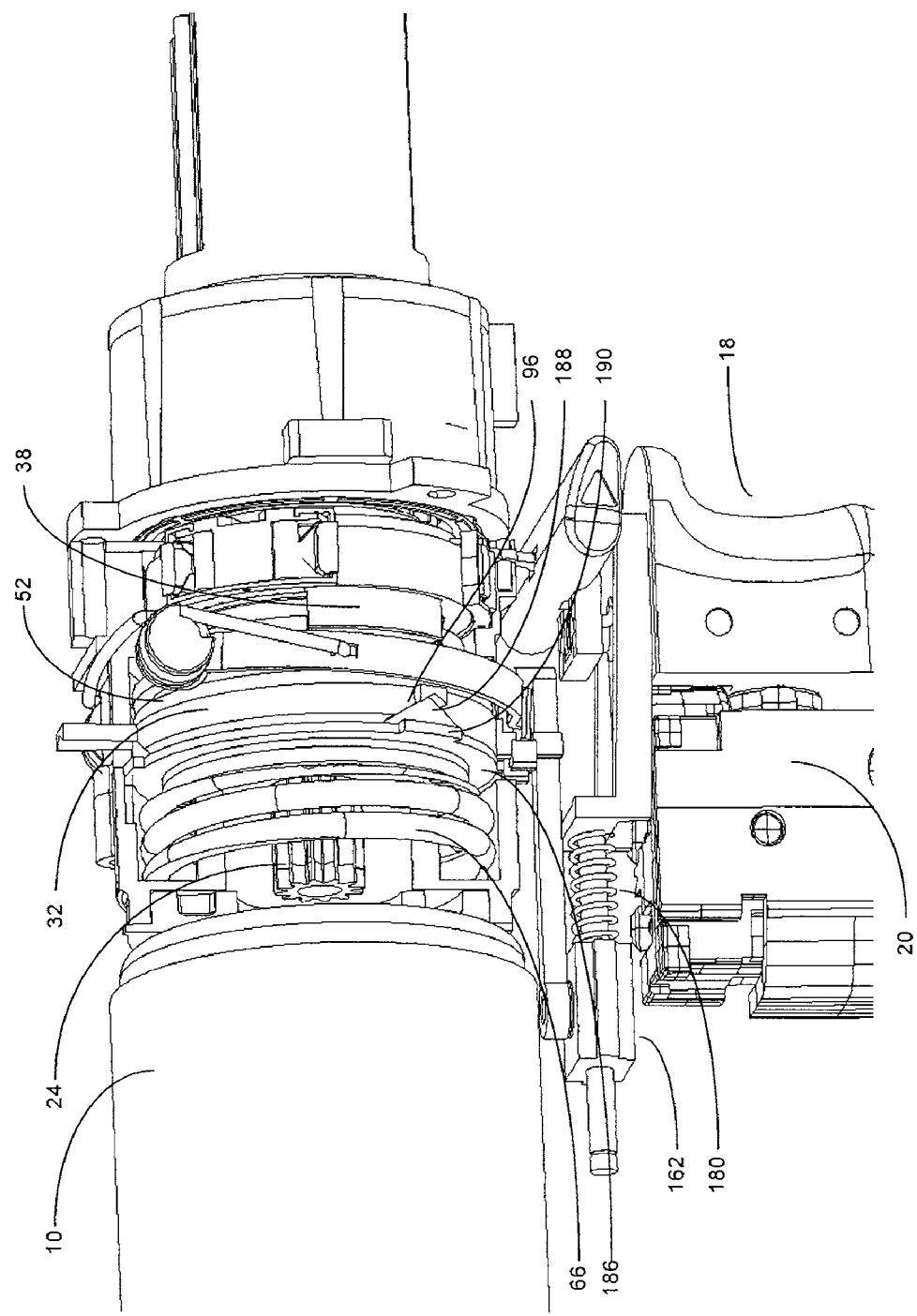
FIG. 12 is an illustration of the transmission after the trigger is fully actuated with portions removed to better illustrate features of the invention.

Turning back to FIG. 4, the first ring gear 32 is an annular member that has teeth on the inner circumferential surface that mesh with the first planetary gears 36. The outer circumferential surface of the first ring gear 32 may form a ledge 94. The first ring gear 32 may also have one or more cam surfaces 96 formed on the external surface (FIG. 12). The cam surfaces 96 may, in one example form a V-shape and, in another example, form a curved shape.

The first ring gear 32 may have a tab 98 extending from the outer circumferential surface. The tab 98 may extend through the first gap 72 of the second housing portion 56. The tab 98 may limit the rotation of the first ring gear 32 to the arc length of the first gap 72. The tab 98 may also provide axial support to the first ring gear 32. The tab 98 may also act as an indicator to the amount of torque received by the transmission 16 during operation of the power tool 2. As discussed below, the first ring gear 32 may rotate in response to a received input torque. The tab 98 may therefore indicate the amount of torque received on the first ring gear 32. In this regard, the tab 98 may also indicate when the transmission 16 may change speeds in response to the received input torque.

The first ring gear 32 may also have one or more protrusions 100 extending from the outer circumferential surface. The protrusions 100 may engage the notches 70 of the second housing portion 56. The protrusions 100 may limit the rotation of the first ring gear 32 to the arc length of the notches 70. The protrusions 100 may also prevent the first ring gear 32 from axial movement within the transmission housing 50. The first ring gear 32 may also have one or more guides 102 extending from the outer circumferential surface. The guides 102 may extend through the second gap 74 of the second housing portion 56. The guides 102 may also limit the rotation of the first ring gear 32 to the arc length of the second gap 74. The guides 102 may also provide axial support to the first ring gear 32. In one example, the arc lengths of the first gap 72, the notches 70, and the second gap 74 are equal such that the tab 98, protrusions 100, and guides 102 cooperate to limit the rotation of the first ring gear 32 an equal amount.

The first carrier 34 includes a disc shaped body 104, a sun gear 106, and one or more retaining members 108. The retaining members 108 and sun gear 106 are on opposite sides of the disc body 104. The sun gear 106 has teeth that mesh with the second planetary gears 42. The retaining members 108 act as axles for the first planetary gears 36. The first carrier 34 may also have one or more protrusions 110 extending from the outer circumferential surface of the disc body 104. The protrusions 110 may engage one or more slots 112 located on the inner circumferential surface of the connector 52 to lock the first carrier 34 with the connector 52 when the connector 52 is in a first position.

The first planetary gears 36 have teeth that mesh with the teeth of the first ring gear 32. The first planetary gears 36 also mesh with teeth on the input pinion 24. Thus, when the motor 10 is activated, the rotational energy is transferred from the input pinion 24 to the first planetary gears 36 and thereon through the rest of the drive train 14. A washer 114 may be coupled to the first planetary gears 36 opposite the side of the first carrier 34 to restrain the first planetary gears 36 from axial movement. The washer 114 may be coupled between the second chamber 62 of the first housing portion 54 and the first planetary gears 36. The washer 114 may also have a bore 116 to allow the input pinion 24 to pass through the washer 114.

The second ring gear 38 is an annular member that has teeth on the inner circumferential surface that mesh with the second planetary gears 42. The outer circumferential surface is circular to enable to the second ring gear 38 to freely rotate within the transmission housing 50. The second ring gear 38, however, may be axially fixed within the transmission housing 50. The second ring gear 38 is coupled to the connector 52. The second ring gear 38 may be coupled to the connector 52 such that the second ring gear 38 and the connector 52 rotate together. In one example, as shown in FIGS. 5 and 6, the second ring gear 38 may have one or more protrusions 118 alternately spaced to define one or more recesses 120. The protrusions 118 and recesses 120 may be located circumferentially around the second ring gear 38. The protrusions 118 and recesses 120 may engage corresponding protrusions 122 and recesses 124 on the connector 52 to lock the second ring gear 38 with the connector 52.

The second carrier 40 includes a disc shaped body 126, a sun gear 128, and one or more retaining members 130. The retaining members 130 and sun gear 128 are on opposite sides of the disc body 126. The sun gear 128 has teeth that mesh with the third planetary gears 48. The retaining members 130 act as axles for the second planetary gears 42. The second planetary gears 42 have teeth that mesh with the teeth of the second ring gear 38. The second planetary gears 42 also mesh with teeth on the sun gear 128 of the first carrier 34. A washer 132 may be coupled to the second planetary gears 42 opposite the side of the second carrier 40 to restrain the second planetary gears 42 from axial movement. The washer 132 may be coupled between the disc body 126 of the first carrier 34 and the second planetary gears 42.

The third ring gear 44 is an annular member that has teeth on the inner circumferential surface that mesh with the third planetary gears 48. The outer circumferential surface is circular to enable the third ring gear 44 to freely rotate within the transmission housing 50. The exterior surface of the third ring gear 44 may have one or more axially extending cam members 134 that may engage a conventional clutch (not shown) to provide the desired torque output. A spacer 136 may be coupled to the third ring gear 44 to axially support the third ring gear 44. The spacer 136 may be coupled between the second housing portion 56 and the third housing portion 58.

The third carrier 46 includes a disc shaped body 138, a sun gear (not shown), and one or more retaining members 140. The retaining members 140 and sun gear are on opposite sides of the disc body 138. The sun gear may, in one example, be coupled to the output spindle 22. In another example, the sun gear may be monolithic with the output spindle 22. The retaining members 140 act as axles for the third planetary gears 48. The third planetary gears 48 have teeth that mesh with the teeth of the third ring gear 44. The third planetary gears 48 also mesh with teeth on the sun gear 128 of the second carrier 40. In one example, the spacer 136 is coupled to the third planetary gears 48 opposite the side of the third carrier 46 to restrain the third planetary gears 48 from axial movement. In another example, a washer (not shown) is coupled to the third planetary gears 48 opposite the side of the third carrier 46 to restrain the third planetary gears 48 from axial movement. The washer may be coupled between the disc body 126 of the second carrier 40 and the third planetary gears 48.

The connector 52 is an annular member that has a circular outer surface to enable the connector 52 to freely rotate within the transmission housing 50. The connector 52 may have a circumferential groove 142 to couple the connector 52 with the spring 88. The connector 52 may have one or more protrusions 122 alternately spaced with one or more recesses 124. The protrusions 122 and recesses 124 may be located circumferentially around the connector 52. The protrusions 122 and recesses 124 may engage the corresponding protrusions 118 and recesses 120 on the second ring gear 38. The protrusions and recesses may remain engaged as the connector 52 moves within the housing.

The connector 52 is axially moveable within the transmission housing 50. The connector 52 may be moveable between a first position and a second position. In the first position, the connector 52 may be locked with the first carrier 34. The inner circumferential surface of the connector 52 may have slots 112 to receive the protrusions 110 on the first carrier 34. As the connector 52 moves to the first position, the slots 112 and protrusions 110 engage, thus locking the connector 52 to the first carrier 34. In the second position, the connector 52 may be unlocked with the first carrier 34. As the connector 52 moves from the first position to the second position, the slots 112 and protrusions 110 disengage. In the second position, the connector 52 and the first carrier 34 may rotate independently. The range of movement of the connector 52 may be limited to ensure the connector 52 and the second ring gear 38 remain in the locked position. For example, the axial movement of the connector 52 may be limited in one direction by the first ring gear 32 and in the opposite direction by a protrusion 144 on the inner circumferential surface of the second housing portion 56.

The spring 88 is coupled to the connector 52 and may apply a biasing force on the connector 52. The spring 88 may bias the connector 52 to the second position. The spring 88 may be a torsion spring, a compression or extension spring, or other spring that may provide a biasing force. In the example shown in FIGS. 5 and 6, the spring 88 is a torsion spring. The torsion spring may have one or more coils 146 to store the spring energy. The torsion spring may be coupled to the exterior surface of the transmission housing 50. The coils 146 may be aligned with the second fittings 84 of the second housing portion 56 so that the screw 86 or other coupling mechanism may extend through the coils 146 and second fittings 84 to secure the torsion spring to the second housing portion 56. The torsion spring may abut the protrusion 90 on the exterior surface of the second housing portion 56 to axially support the torsion spring. The torsion spring may also have one or more pins 148 that extend through the apertures 82 of the second housing portion 56 to engage the circumferential groove 142 of the connector 52. The torsion spring may also be resilient to torque forces exerted on the drive train 14 during the operation of the power tool 2.

A pivot lever 150 may be coupled to the spring 88. The pivot lever 150 may be C-shaped and extend partially circumferentially around the exterior surface of the transmission housing 50. The pivot lever 150 may have one or more holes 152 that align with the coils 146 and second fittings 84 to receive the screw 86 or other coupling mechanism to secure the pivot lever 150 to the second housing portion 56. The pivot lever 150 may pivot around the coupling axis 154. The pivot lever 150 may have one or more apertures 156 that may be aligned with the apertures 82 of the second housing portion 56. The pins 148 of the spring 88 may extend through both apertures 82, 156 to engage the circumferential groove 142 of the connector 52. Thus, as the pivot lever 150 pivots around the coupling axis 154, the pivot lever 150 guides the spring 88. In one example, the pivot lever 150 may axially guide the spring 88 to move the connector 52 to the first position. The slot length of the apertures 82 of the second housing portion 56 may restrict the axial movement of the pivot lever 150. The pivot lever 150 may also have a lip 158 to engage a control mechanism 160. The pivot lever 150 may also be resilient to torque forces exerted on the drive train 14 during operation of the power tool 2.

The control mechanism 160 may direct the compression of the spring 88. The control mechanism 160 may direct the compression of the spring 88 via the pivot lever 150. The control mechanism 160 may be coupled to a holder 162. In one example, the control mechanism 160 has an aperture 164 that receives a knob 166 to attach the control mechanism 160 to the holder 162, although other coupling methods may be used. Thus, the control mechanism 160 may axially move with the holder 162. The control mechanism 160 may also have a tab 168 that may engage the lip 158 of the pivot lever 150. The tab 168 may also engage the spring 88 directly. When the control mechanism 160 axially moves in response to movement of the holder 162, the tab 168 may apply an axial force on the lip 158 and pivot the pivot lever 150 to cause the spring 88 to move the connector 52 to the first position. The control mechanism 160 may also extend through the guides 102 of the first ring gear 32. Thus, as the first ring gear 32 rotates in response to a received input torque, the guides 102 rotationally guide the control mechanism 160.

Figure 19:
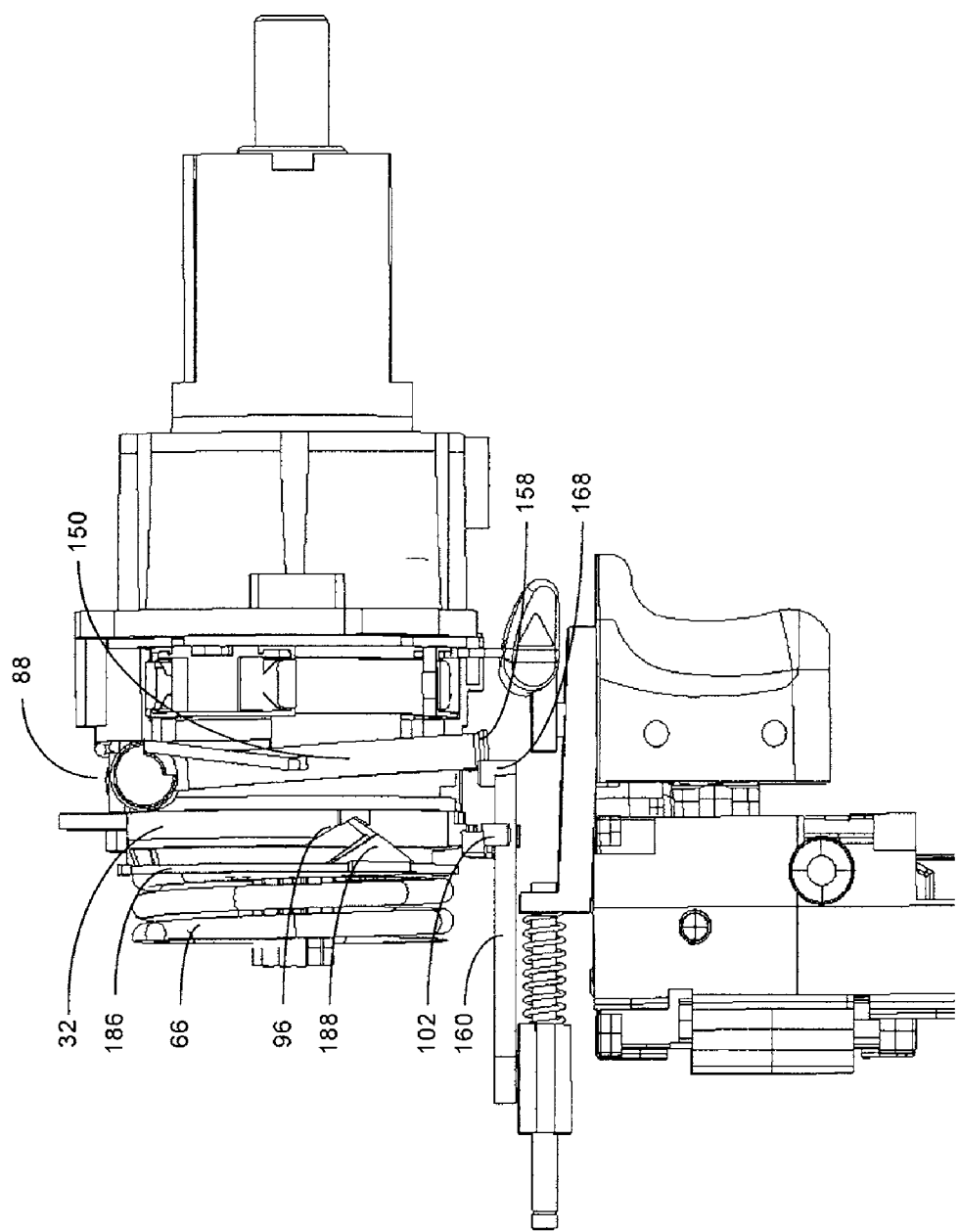
FIG. 19 is an illustration of the transmission changing speeds.
Figure 20:
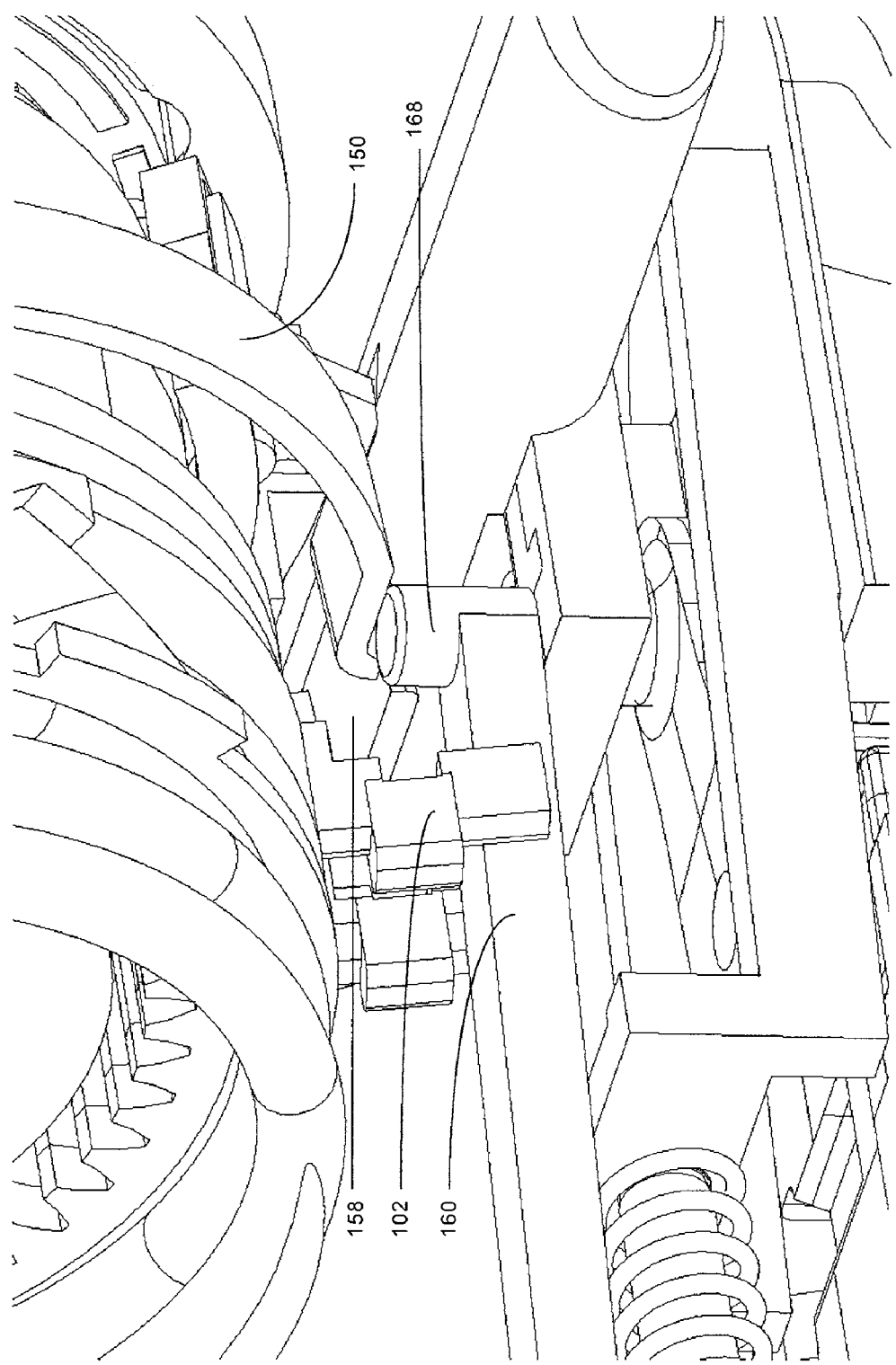
FIG. 20 is a close up illustration of the transmission changing speeds.

The holder 162 is axially movable within the power tool housing 4. The power tool housing 4, however, may confine the axial movement via a rib 170 (FIG. 2) located within the power tool housing 4. Therefore, when the holder 162 moves a predetermined axial distance in one direction, the holder 162 engages the rib 170 and is prohibited from further axial movement in that direction. The rib 170 may be positioned to enable the holder 162 and thus the control mechanism 160 enough axial movement to move the connector 52 into the first position. The rib 170 may also disable the control mechanism 160 from axially surpassing the pivot lever 150 (FIG. 19) and, therefore, may prevent the control mechanism 160 from becoming lodged behind the pivot lever 150.

The holder 162 may have an alignment protrusion 172 to align with an alignment groove 174 located within the power tool housing 4. The alignment protrusion 172 and alignment groove 174 confine the holder 162 to axial movement. The holder 162 may also have an aperture 176 extending axially through the holder 162. The aperture 176 may receive a holder bar 178 that extends through the aperture 176. The holder bar 178 may be coupled at the opposite end to the trigger switch 18, such that the holder bar 178 axially moves with the trigger switch 18. A holder spring 180 is located between the holder 162 and the trigger switch 18 to bias the holder 162 away from the trigger switch 18. The holder spring 180 may circumferentially surround the holder bar 178.

The trigger switch 18 is coupled to the motor switch 20 by a trigger spring 182. The trigger spring 182 returns the trigger switch 18 to the resting position when the user releases the trigger switch 18. The trigger spring 182 may circumferentially surround a trigger bar 184 extending from the motor switch 20. The trigger bar 184 may alternatively extend from the trigger switch 18. The trigger bar 184 may direct the actuation of the motor switch 20, such that motor switch 20 is not actuated until the trigger bar 184 is actuated. The trigger bar 184 may be located a predetermined distance from the trigger switch 18 so that initial actuation of the trigger switch 18 does not engage the trigger bar 184 and actuate the motor switch 20. In one example, the trigger bar 184 may be located 5 millimeters from the trigger switch 18, such that the trigger switch 18 may be actuated 5 millimeters before actuating the motor switch 20. Other distances, however, may be used.

Figure 7:
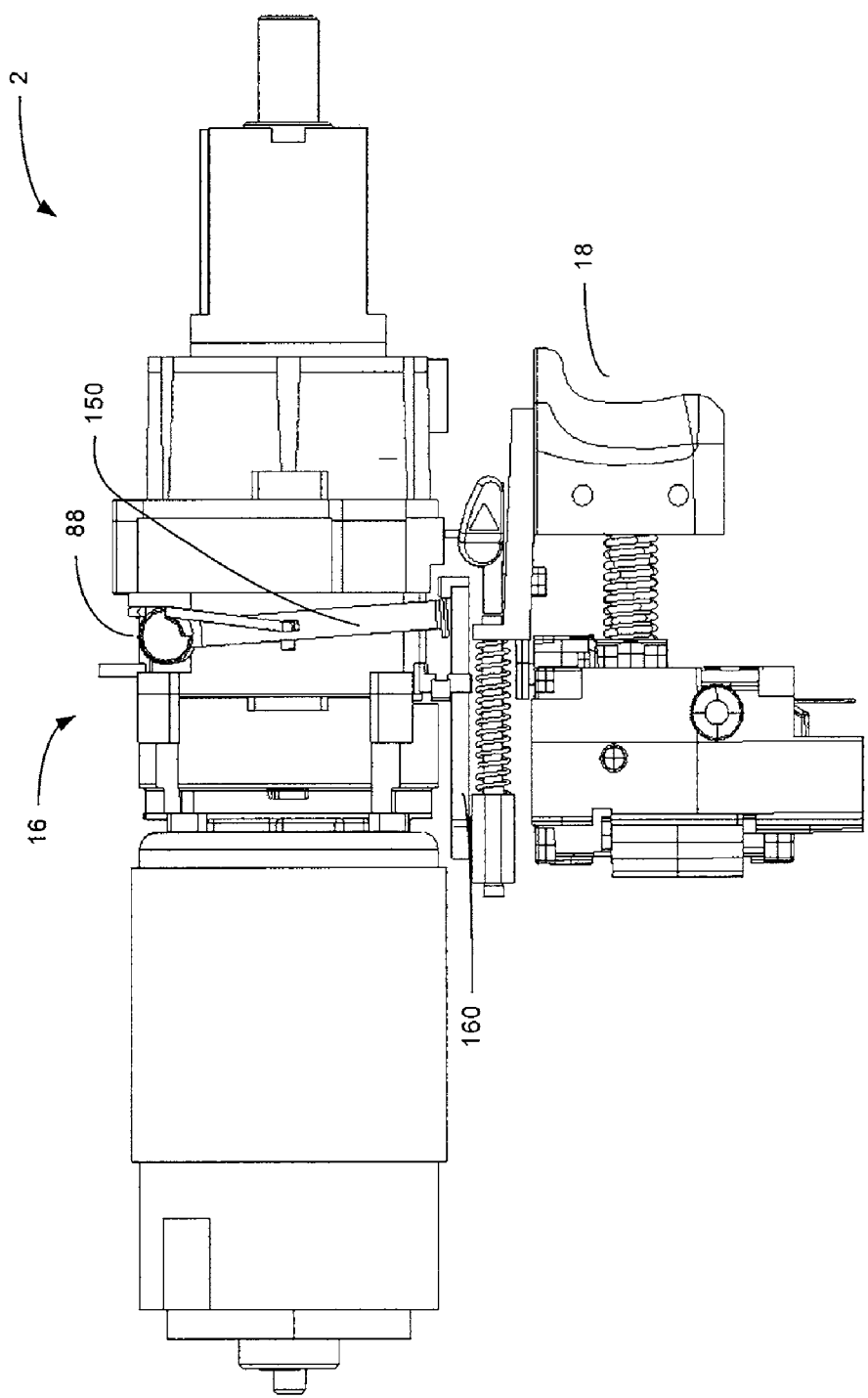
FIG. 7 is an illustration of the transmission in a resting state.
Figure 8:
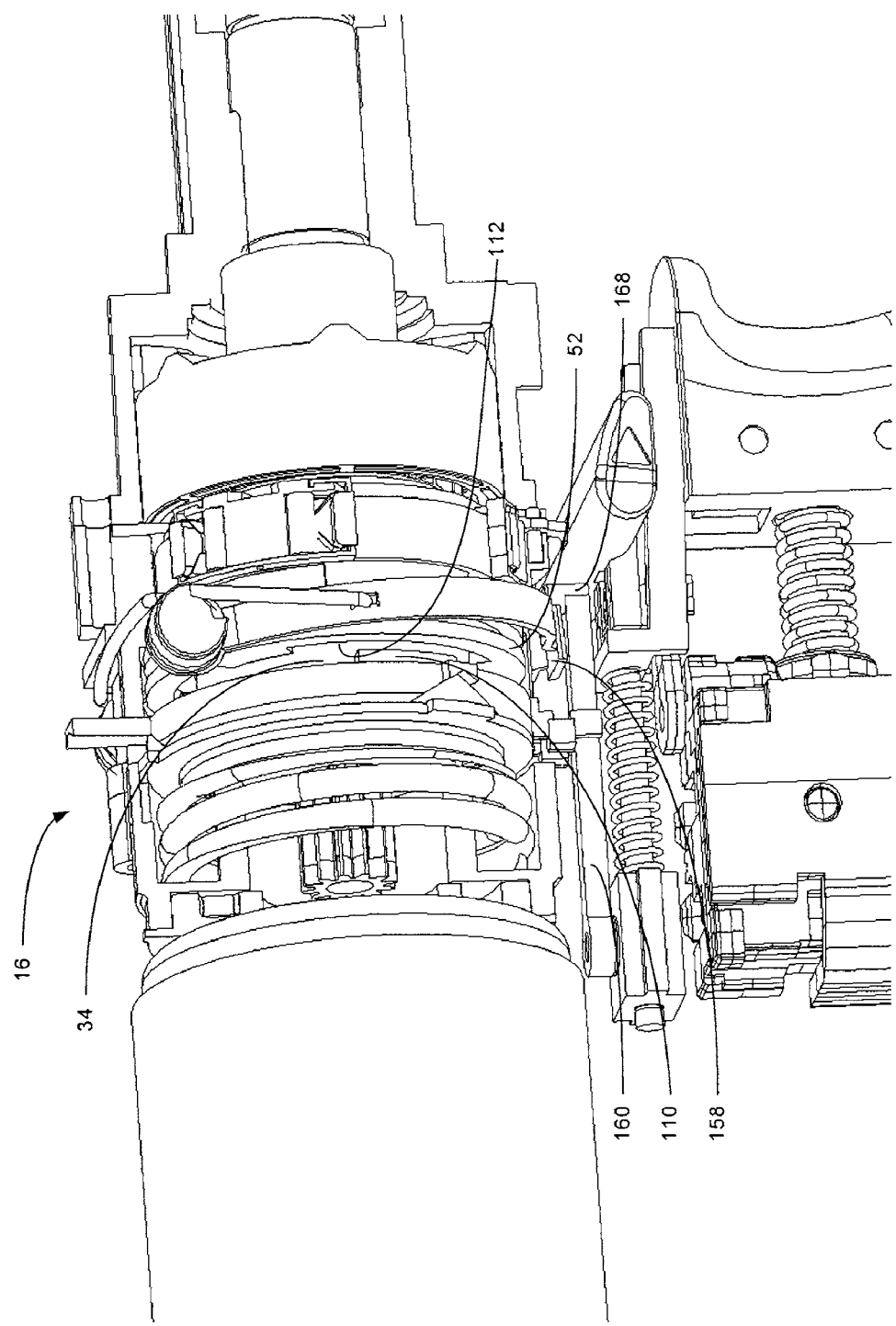
FIG. 8 is a closer view of the transmission of FIG. 7.

The example in FIG. 7 shows a power tool 2 having the variable speed transmission 16 where the transmission is in the resting state, i.e. the trigger switch 18 is not actuated. In the resting state, the control mechanism 160 may not exert an axial force on the pivot lever 150 and thus the spring 88 is free to bias the connector 52 in the second position. FIG. 8 shows an example of the transmission 16 in the resting state where the connector 52 is in the second position. In this position, the slots 112 of the connector 52 are not coupled with the protrusions 110 of the first carrier 34.

Figure 9:
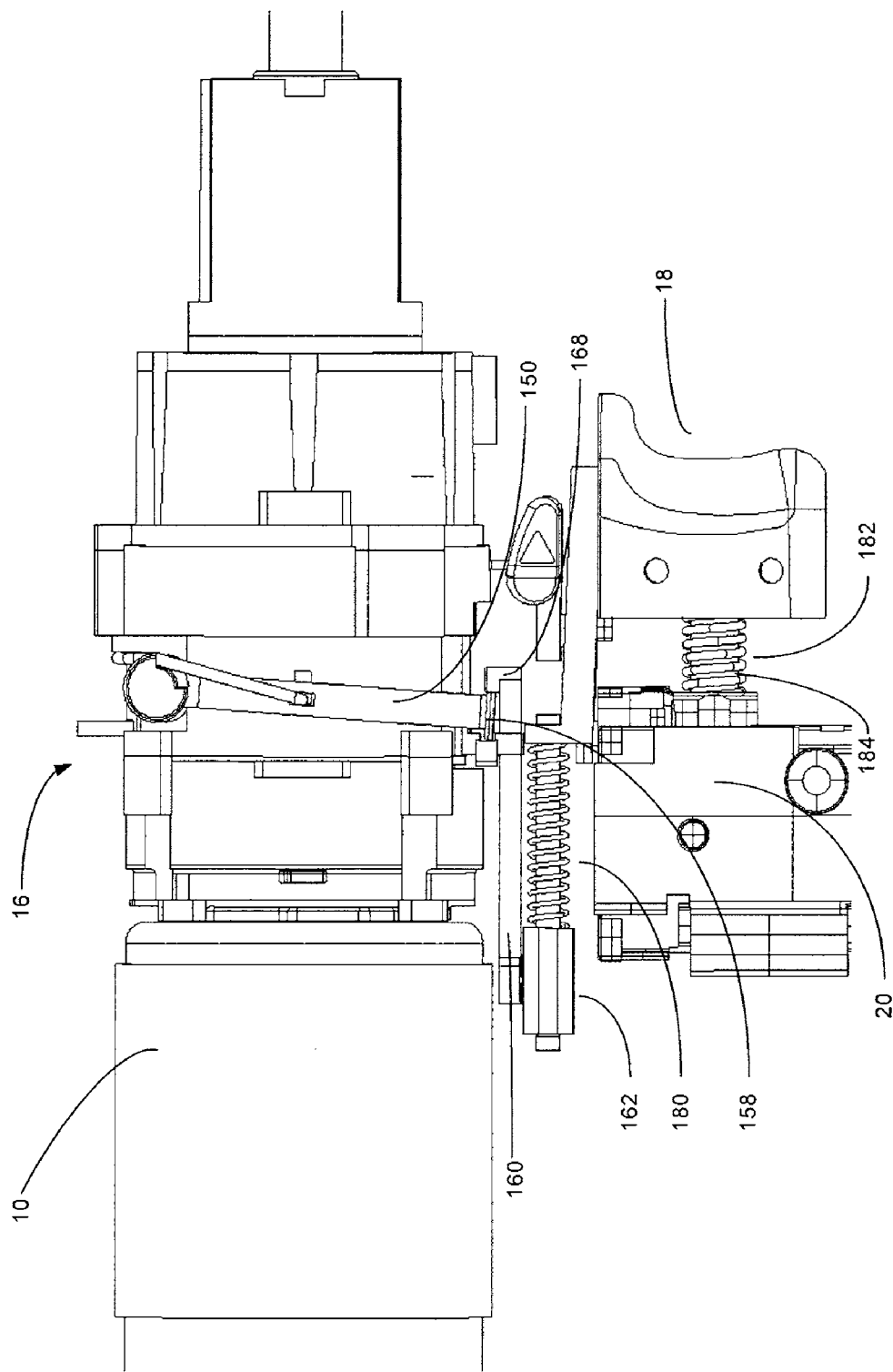
FIG. 9 is an illustration of the transmission after the trigger is partially actuated.
Figure 10:
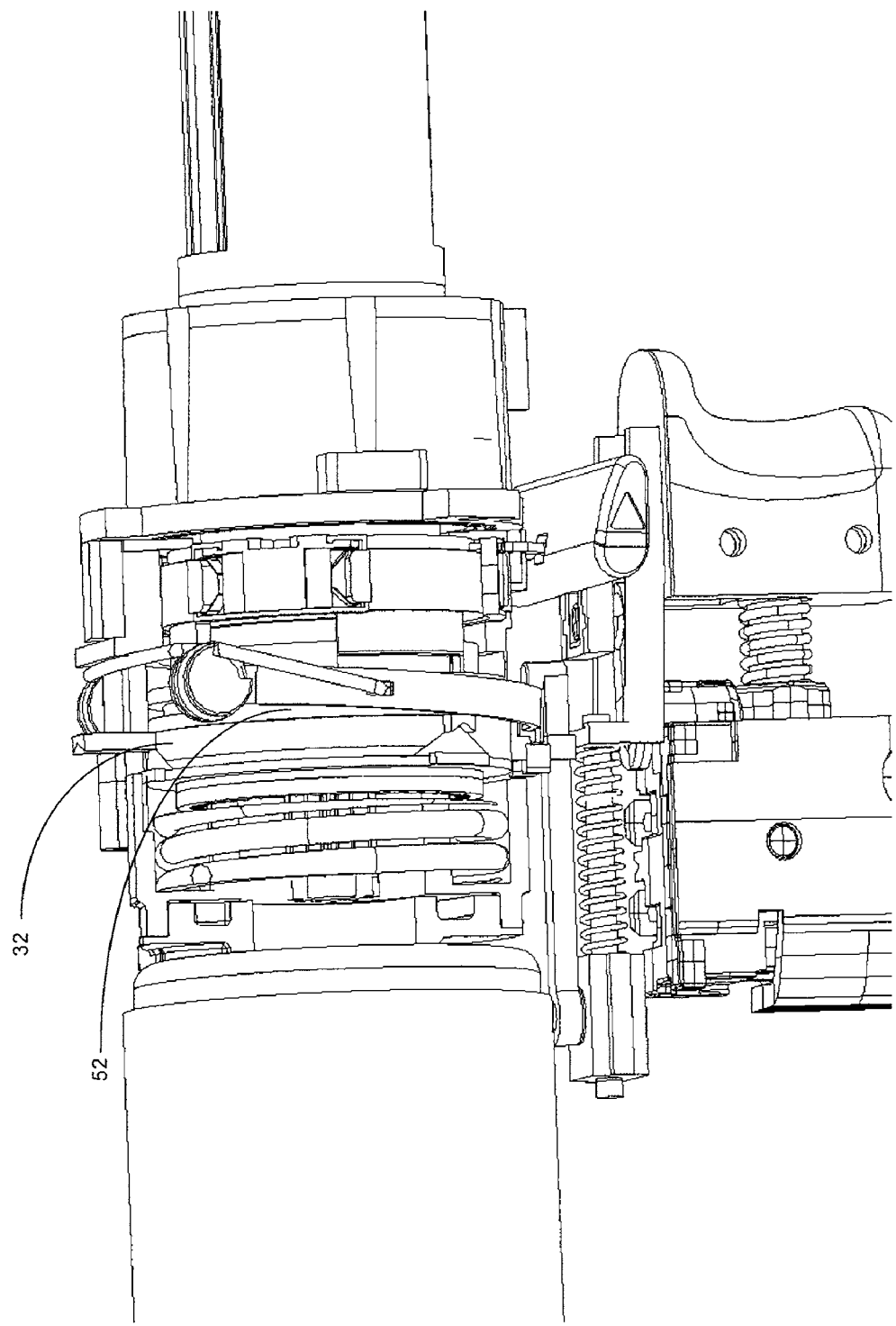
FIG. 10 is an illustration of the transmission after the trigger is partially actuated with portions removed to better illustrate features of the invention.

When the trigger switch 18 is actuated, as shown in FIG. 9, the transmission 16 leaves the resting state. Actuation of the trigger switch 18 may compress the trigger spring 182. The trigger switch 18, however, may not actuate the motor switch 20 until the trigger bar 184 is engaged by the trigger switch 18. The connector 52 may, therefore, be moved to the first position before the motor 10 is activated. The actuated trigger switch 18 may exert an axial force on the holder spring 180 and the holder spring 180 may, in turn, exert an axial force on the holder 162. Because the holder 162 is allowed to axially move within the power tool housing 4, the holder spring 180 axially moves the holder 162. The movement of the holder 162 may move the control mechanism 160 to pivot the pivot lever 150. The pivot lever 150 may compress the spring 88 and the spring 88 may axially move the connector 52 to the first position. The connector 52 is shown in the first position in FIG. 10.

The slots 112 on the connector 52 may have a greater clearance area to increase the likelihood that the protrusions 110 on the first carrier 34 may engage the slots 112 as the connector 52 moves from the second position to the first position (FIG. 8). The slots 112 and protrusions 110, however, may not be in alignment when the connector 52 changes position. In such a case, the connector 52 cannot fully move to the first position. The control mechanism 160 and holder 162 thus stop short of the rib 170 and the actuation of the trigger switch 18 compresses the holder spring 180 against the holder 162. As the trigger switch 18 continues to be actuated, the trigger switch 18 engages the trigger bar 184 and actuates the motor switch 20. The motor 10 may, therefore, begin to rotate the input pinion 24, which, in turn, rotates the first carrier 34. As the first carrier 34 rotates, the slots 112 may become aligned with the protrusions 110 and thus, the energy stored within the compressed holder spring 180 may be released and the connector 52 may be forced to the first position. Upon movement of the connector 52 to the first position, the holder spring 180 may also force the holder 162 against the rib 170 of the power tool housing 4.

Thus, in the case where the slots 112 and protrusions 110 are aligned, the connector 52 may move to the first position when the trigger switch 18 is actuated. In the case where the slots 112 and protrusions 110 are not aligned, the activation of the motor 10 may rotate the first carrier 34 such that the slots 112 and protrusions 110 may become aligned and the compressed holder spring 180 may force the connector 52 to the first position. Either way, the connector 52 is in the first position when the power tool 2 is activated.

Figure 11:
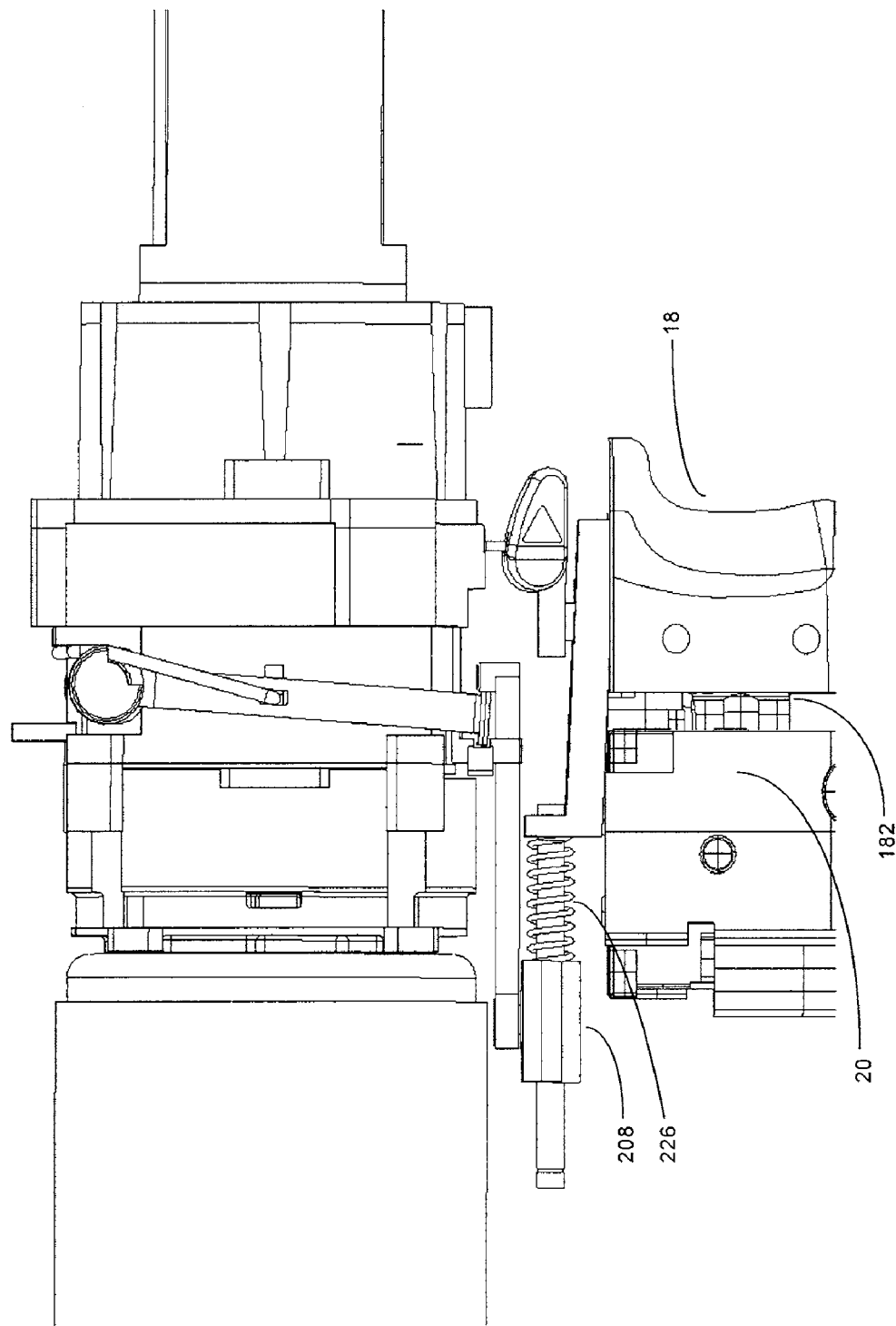
FIG. 11 is an illustration of the transmission after the trigger is fully actuated.

As shown in FIGS. 11 and 12, the trigger switch 18 is fully actuated and the trigger spring 182 is fully compressed. The holder spring 180 is also compressed against the holder 162 abutting the rib 170 of the tool housing 4 (not shown). The motor 10 rotates the input pinion 24, which, in turn, rotates the first planetary gears 36. The first planetary gears 36 rotate against the first ring gear 32 and cause the first carrier 34 to rotate. The input pinion 24, first planetary gears 36, and first carrier 34 may rotate at different speeds.

In the first position, the connector 52 is locked with the first carrier 34 and thus the connector 52 rotates with the first carrier 34. The connector 52 is also coupled with the second ring gear 38 and thus the first carrier 34 and the second ring gear 38 rotate together at the same speed. The locking of the first carrier 34 and the second ring gear 38 also locks the second planetary gears 42, which, in turn, lock the second carrier 40 to rotate with the first carrier 34 at the same speed. Thus, when the connector 52 is in the first position, the first carrier 34 and the second transmission portion 28 rotate together to produce a first transmission output.

The output of the second transmission portion 28 (sun gear 128) rotates the third planetary gears 48 which, in turn, rotates the third carrier 46. The third carrier 46 rotates the output spindle 22. Because the output of the second transmission portion 28 is the same as the output of the first transmission portion 26, the transmission 50 produces a high speed, low torque output. The high speed, low torque output is provided during the initial stages of the task performed by the power tool 2.

As the operation of the task performed by the power tool 2 advances to the final stages, an increased amount of torque is generally required to complete the task. As the torque increases, the first ring gear 32 may begin to rotate within the transmission housing 50. The amount of torque required to rotate the first ring gear 32 may be predetermined by the torque spring 66. The torque spring 66 exerts an axial force against the first ring gear 32. A torque washer 186 may be coupled between the torque spring 66 and the first ring gear 32. The torque washer 186 is an annular member that may have one or more cam members 188 to engage the cam surfaces 96 of the first ring gear 32. In one example, the cam members 188 form a V-shape to match the cam surfaces 96. In another example, the cam members 188 may be curved to match curved cam surfaces.

The torque washer 186 may axially move within the transmission housing 50. The torque washer 186 may rest on the ledge 94 on the outer circumferential surface of the first ring gear 32. The ledge 94 may act as an axial guide to the torque washer 186 as the torque washer 186 axially moves. The torque washer 186 may also have one or more protrusions 190 extending from the outer circumferential surface. The protrusions 190 may engage the first gap 72 and the notches 70 of the second housing portion 56 to limit the rotation of the torque washer 186 and ensure the cam members 188 remain in engagement with the cam surfaces 96.

Figure 13:
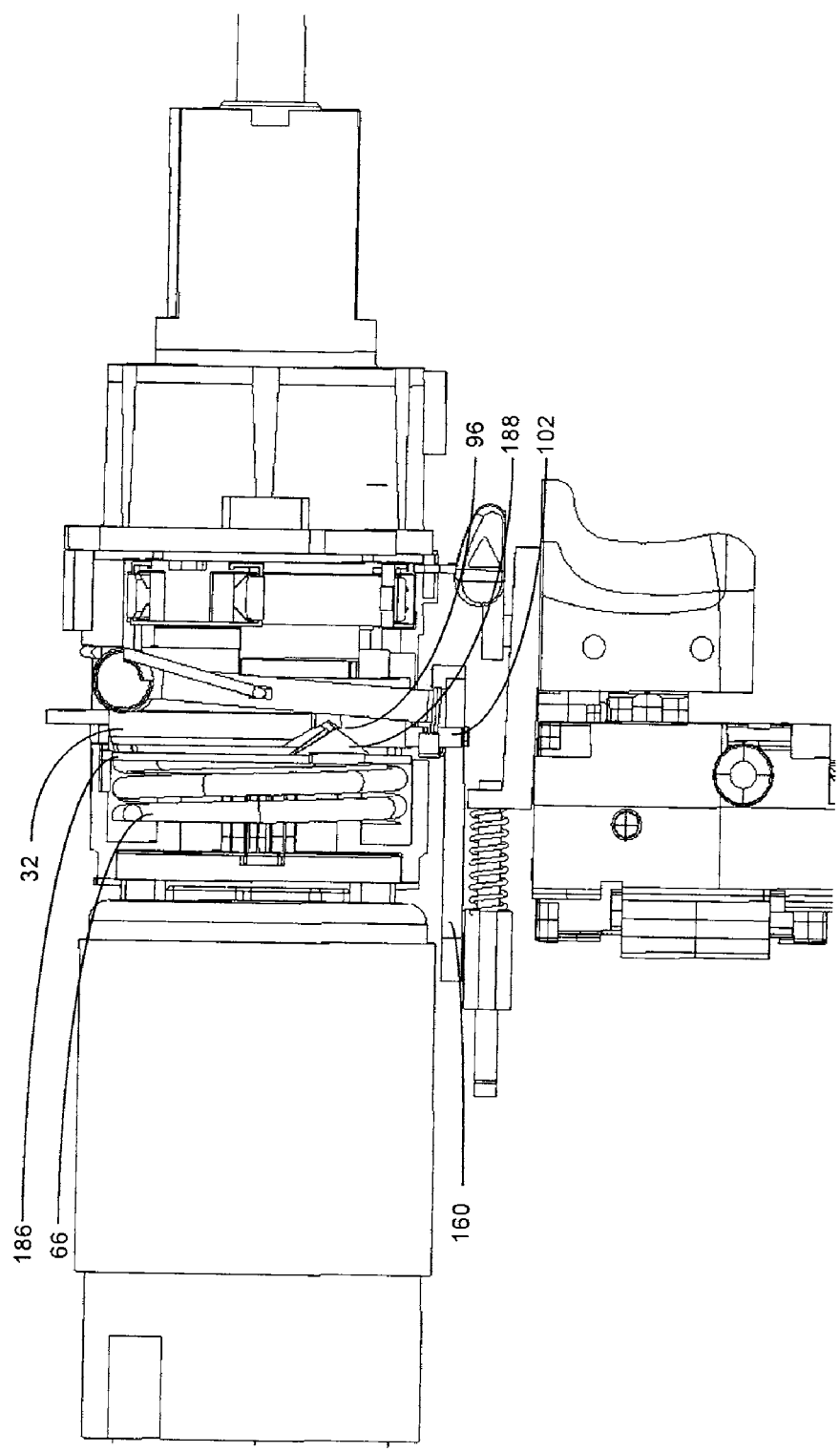
FIG. 13 is an illustration of the transmission responding to an increase in torque with portions removed to better illustrate features of the invention.
Figure 14:
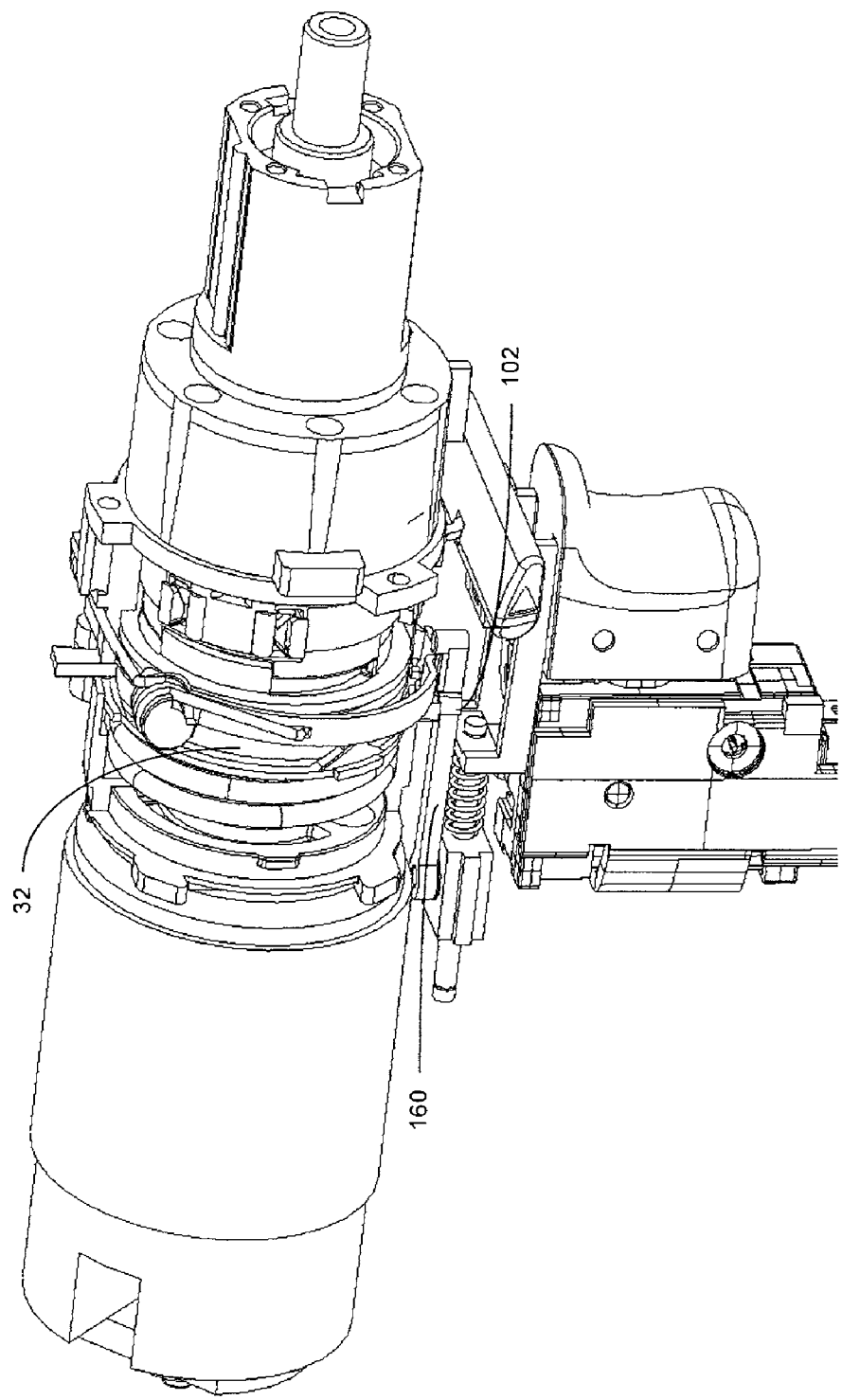
FIG. 14 is an illustration of the transmission responding to an increase in torque with portions removed to better illustrate features of the invention.
Figure 15:
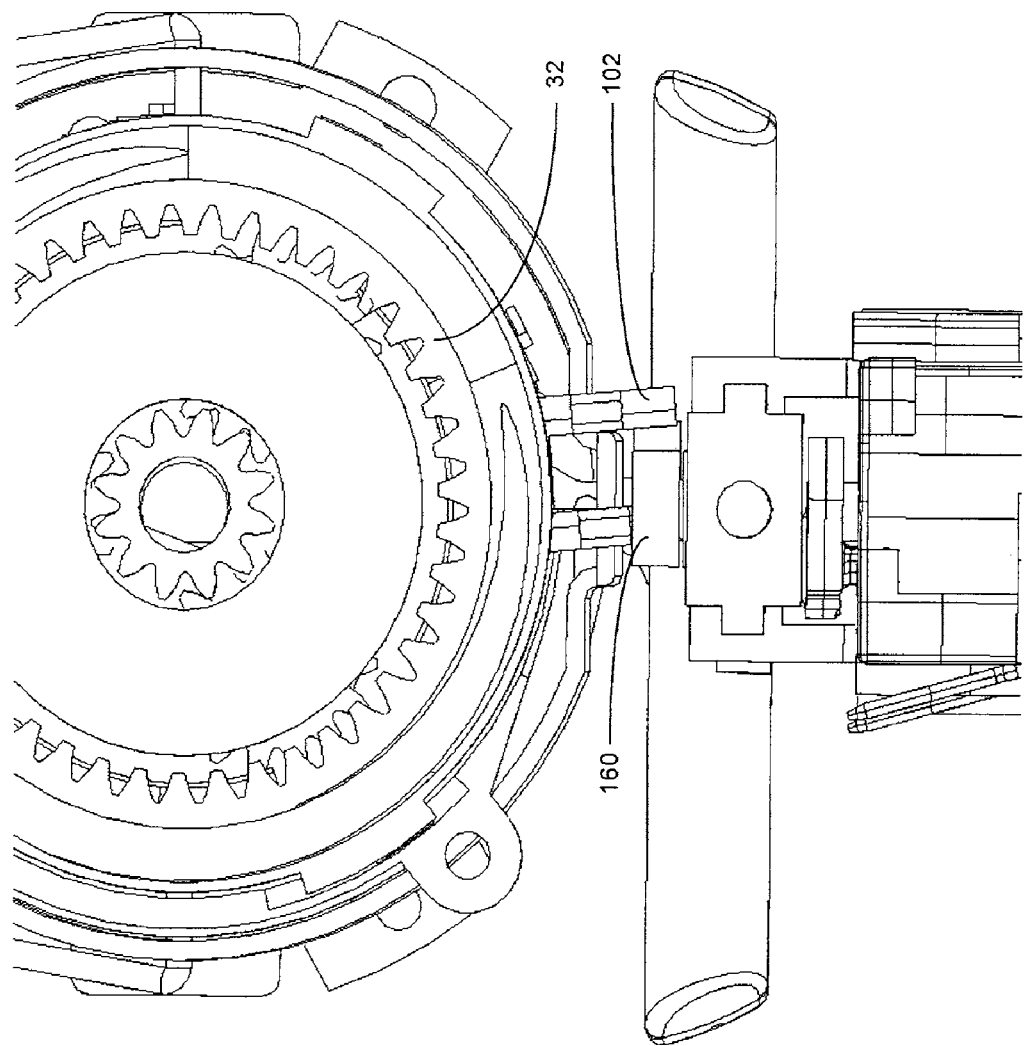
FIG. 15 is an illustration of an exemplary first ring gear rotating in response to an increase in torque.
Figure 16:
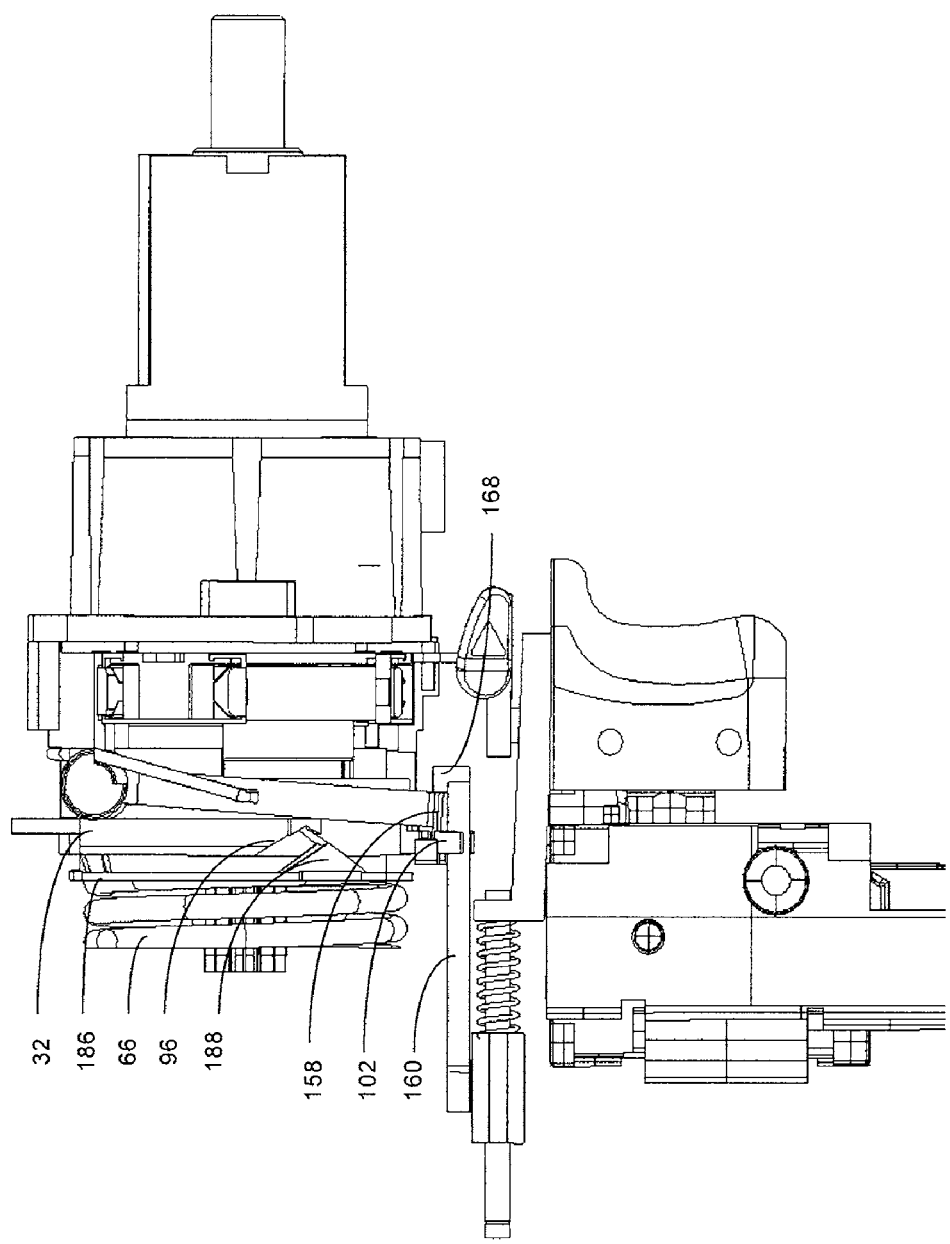
FIG. 16 is an illustration of an exemplary first ring gear rotating in response to an increase in torque.
Figure 17:
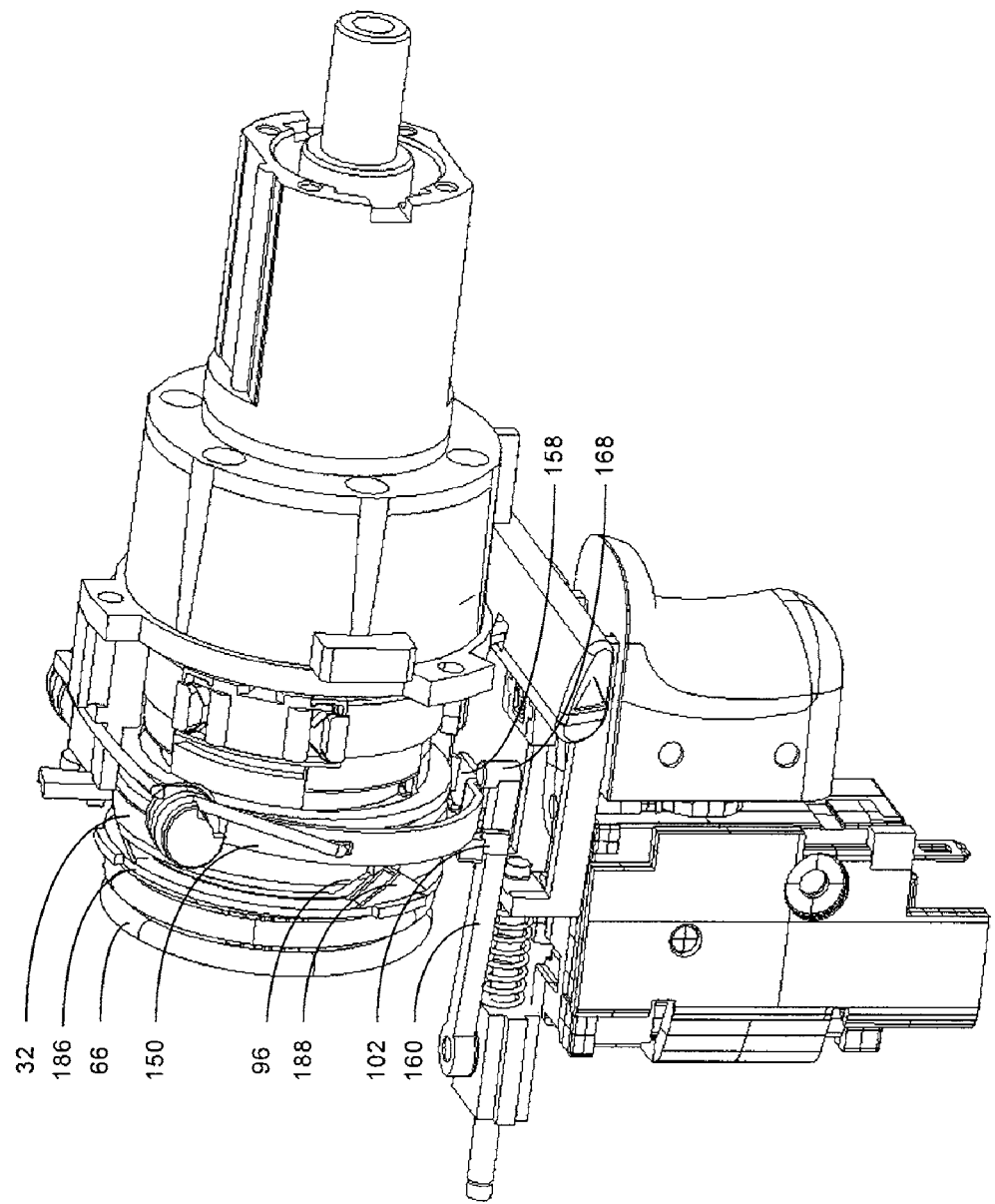
FIG. 17 is an illustration of an exemplary first ring gear rotating in response to an increase in torque with portions removed to better illustrate features of the invention.
Figure 18:
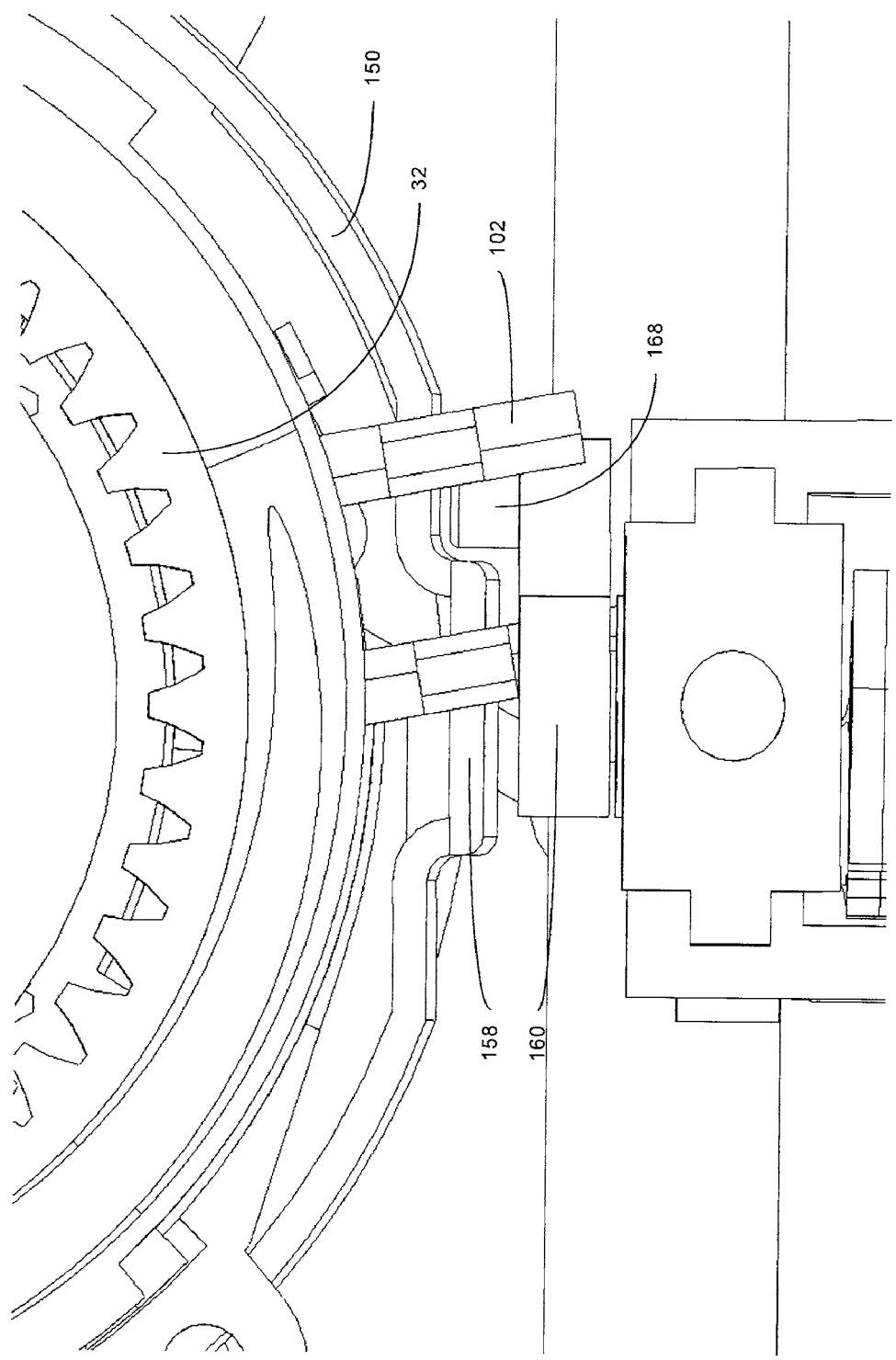
FIG. 18 is a close up illustration of an exemplary first ring gear rotating in response to an increase in torque.

As increased torque is required, the first ring gear 32 may begin to rotate, as shown in FIG. 13. The slope of the cam surfaces 96 force the cam members 188 outwards and thus the first ring gear 32 axially forces the torque washer 186 into the force of the torque spring 66. As the first ring gear 32 rotates, the guides 102 may guide the control mechanism 160 to rotate, as shown in FIGS. 14 and 15. When the received torque equals the force of the torque spring 66, the cam members 188 are forced to the outer edges of the cam surfaces 96, as shown in FIG. 16. At this degree of rotation, the tab 168 of the control mechanism 160 rotates past the lip 158 of the pivot lever 150 as shown in FIG. 17. The control mechanism 160 disengages the pivot lever 150 as shown in FIG. 18.

When the control mechanism 160 disengages the pivot lever 150, the spring 88 releases the stored energy and may force the connector 52 to the second position, as shown in FIG. 8. In the second position, the slots 112 of the connector 52 disengage the protrusions 110 of the first carrier 34 and the connector 52 is unlocked with the first carrier 34. Thus, the first carrier 34 and the connector 52 may rotate independently. Because the connector 52 is coupled with the second ring gear 38, the first carrier 34 may also rotate independently of the second ring gear 38.

Once the connector 52 and therefore the second ring gear 38 unlocks with the first carrier 34, the first carrier 34 via the sun gear 106 rotates the second planetary gears 42 which, in turn, forces the second ring gear 38 to rotate in the opposite direction that the second ring gear 38 was rotating when the second ring gear 38 was locked to the first carrier 34. A one-way clutch 78, however, prohibits the second ring gear 38 from rotating in the opposite direction (see FIGS. 5 and 6). The second ring gear 38 is locked by the one-way clutch 78. The sun gear 106 of the first carrier 34 rotates the second planetary gears 42 against the second ring gear 38, which, in turn, rotates the second carrier 40. The second carrier 40 therefore rotates independently of the first carrier 34. Thus, when the connector 52 is in the second position, the first transmission portion 26 and the second transmission portion 28 rotate independently to produce a second transmission output.

The output of the second transmission portion 28 (sun gear 128) rotates the third planetary gears 48 which, in turn, rotates the third carrier 46. The third carrier 46 rotates the output spindle 22. Because the first transmission portion 26 and the second transmission portion 28 rotate independently, the transmission 50 produces a low speed, high torque output.

The low speed, high torque output is provided during the final stages of the task performed by the power tool 2.

Figure 21:
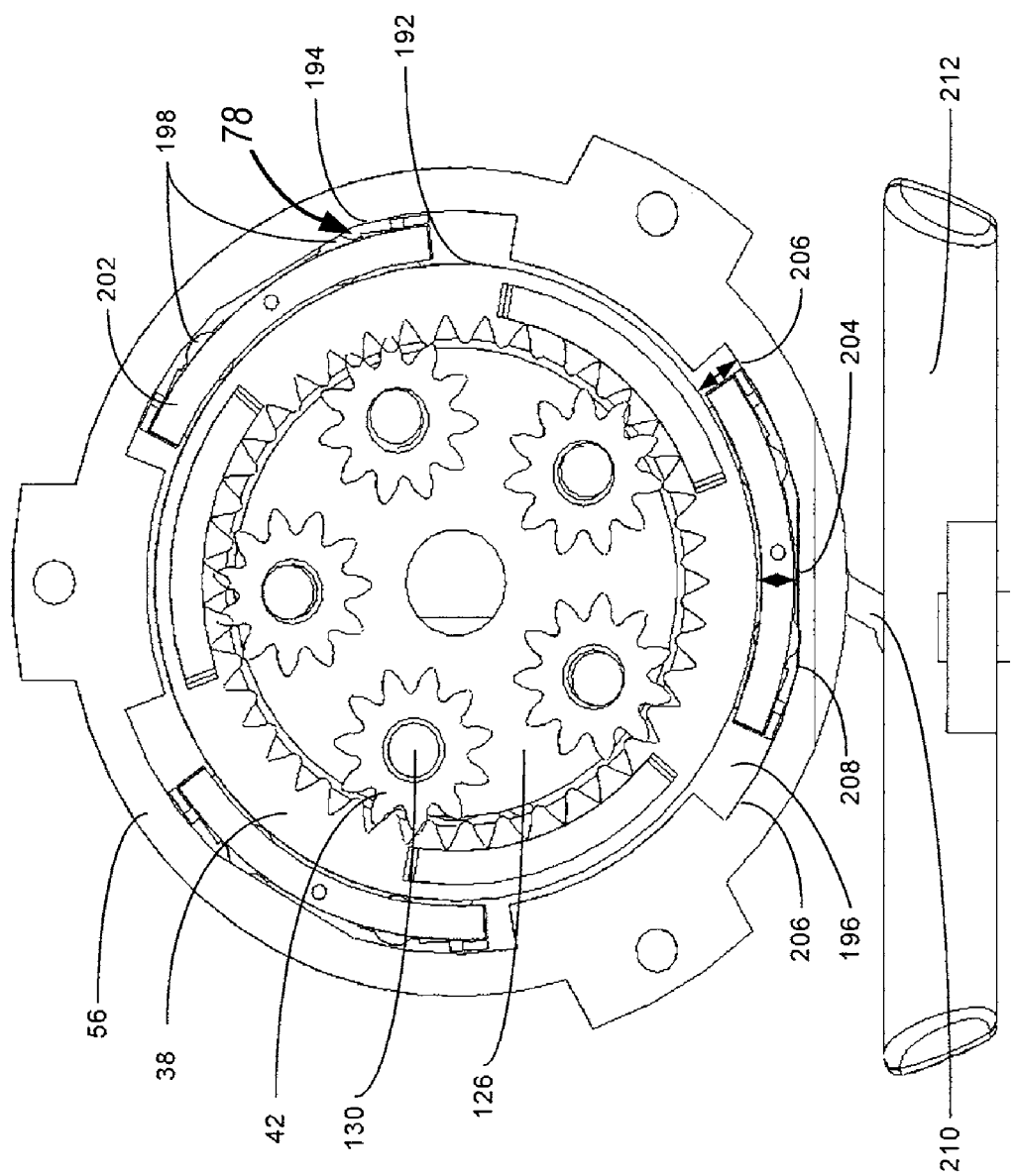
FIG. 21 is an illustration of an exemplary one-way clutch set in the forward position.
Figure 22:
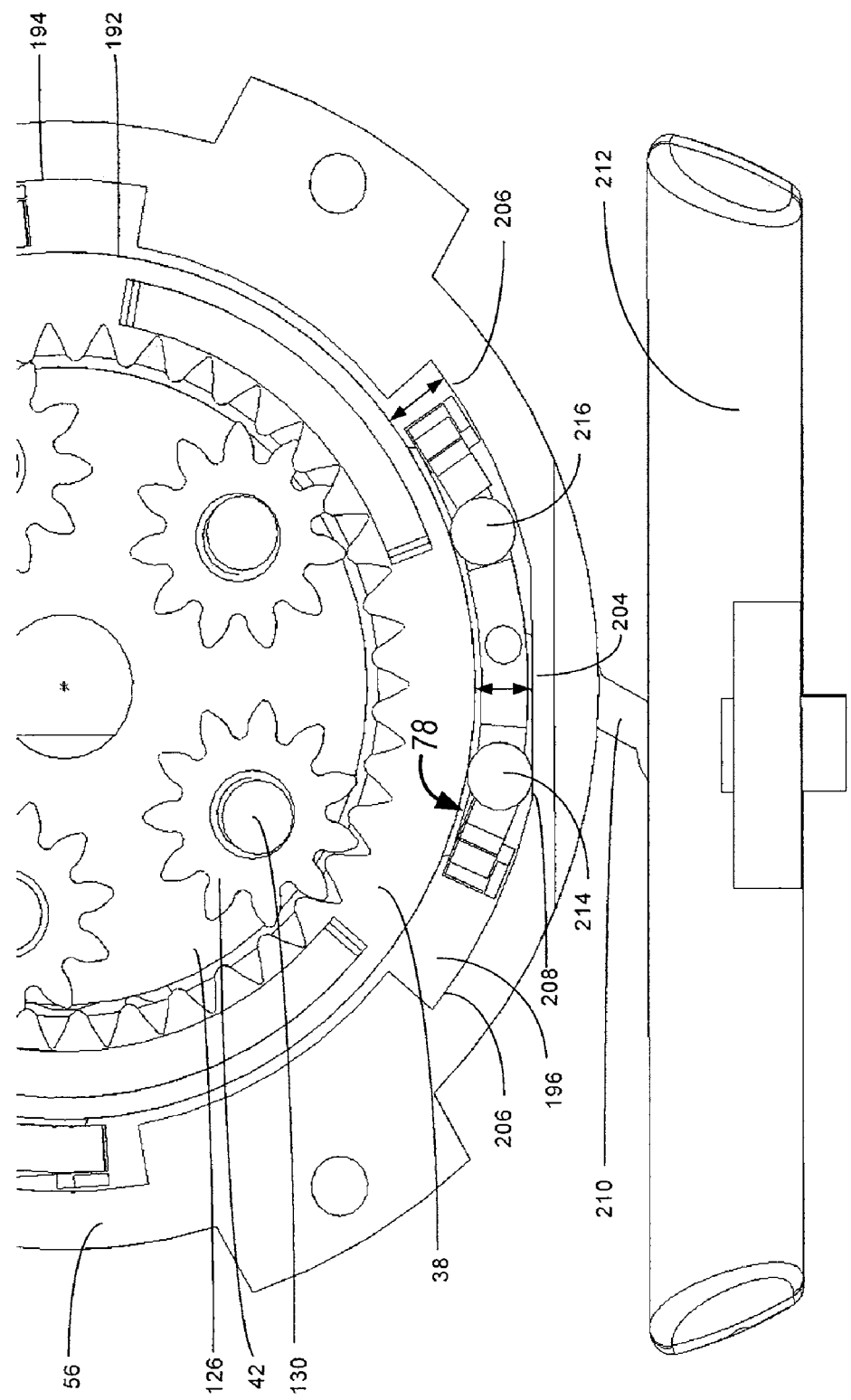
FIG. 22 is a close up illustration of the exemplary one-way clutch set of FIG. 21.

An example of the one-way clutch 78 is shown in FIGS. 21 and 22. The one-way clutch 78 allows the second ring gear 38 to rotate in one direction and prohibits the second ring gear 38 from rotating in the opposite direction. The one-way clutch 78 has an inner race 192 defined by the outer circumferential surface of the second ring gear 38 and an outer race 194 defined by the grooves 76 formed within the inner circumferential surface of the second housing portion 56. The inner race 192 and outer race 194 form one or more compartments 196. The one-way clutch 78 has one or more lock pins 198 that are received in the compartments 196. The lock pins 198 are coupled to a clutch washer 200 (shown in FIGS. 5 and 6) by lock pin holders 202.

The compartments 196 have a lock portion 204 and a release portion 206. The lock portion 204 is formed by an inclined surface 208 on the outer race 194. The inclined surface 208 creates a smaller distance between the inner race 192 and the outer race 194 than the diameter of the lock pins 198 to prohibit the lock pins 198 from rotating. The release portion 206 has a distance between the inner race 192 and the outer race 194 that is greater than the diameter of the lock pins 198 to permit the lock pins 198 to freely rotate. As shown in the example in FIG. 22, the lock portion 204 is centered within the compartments 196 and located between two release portions 206.

The clutch washer 200 is coupled to a clutch lever 210. The clutch lever 210 rotates the clutch washer 200 depending on the direction of pivot of the clutch lever 210. The clutch lever 210 is directed by a forward/reverse button 212. The forward/reverse button 212 is coupled to the motor 10 to determine the rotating direction of the motor 10. When the forward/reverse button 212 is set to the forward output (motor 10 rotates the input pinion 24 in a clockwise direction), the forward/reverse button 212 directs the clutch lever 210 to rotate the clutch washer 200 in the counter-clockwise direction. In this position, the one-way clutch 78 permits the second ring gear 38 to rotate in the clockwise direction and prohibits the second ring gear 38 from rotating in the opposite direction. Alternatively, when the forward/reverse button 212 is set to the reverse output (motor 10 rotates the input pinion 24 in the counter-clockwise direction), the forward/reverse button 212 directs the clutch lever 210 to rotate the clutch washer 200 in the clockwise direction. In this position, the one-way clutch 78 permits the second ring gear 38 to rotate in the counter-clockwise direction and prohibits the second ring gear 38 from rotating in the opposite direction.

In the examples in FIGS. 21 and 22, the forward/reverse button 212 is set to the forward output and the clutch washer 200 is rotated in the counter-clockwise direction. As shown in FIG. 22, the clutch washer 200 moves a first lock pin 214 to the lock portion 204 of the compartment 196 and moves a second lock pin 216 to the release portion 206 of the compartment 196. Thus, rotation of the second ring gear 38 in the counter-clockwise direction is prohibited because the rotation will force the first lock pin 214 into the lock portion 204 where the first lock pin 214 is prohibited from rotating. The friction against the first lock pin 214 and the second ring gear 38 prohibits the second ring gear 38 from rotating in the counter-clockwise direction. The second ring gear 38 may, however, rotate in the clockwise direction because the force of the rotation will force the first lock pin 214 out of the lock portion 204 where the first lock pin 214 may freely rotate. The second lock pin 216 remains in the release portion 206 due to the setting of the clutch lever 210 and also may freely rotate. Thus, the second ring gear 38 may rotate in the clockwise direction when the forward/reverse button 212 is set to the forward output. The one-way clutch 78 works in a similar manner when the forward/reverse button 212 is set to the reverse output.

Therefore, as the transmission 16 outputs in high speed, low torque, the second ring gear 38 rotates with the first carrier 34 and in the same direction as the input pinion 24. The one-way clutch 78 allows the second ring gear 38 to rotate in this direction. As the torque increases, however, the second ring gear 38 unlocks with the first carrier 34 via the connector 52 and the transmission 16 outputs in the low speed, high torque. When the transmission 16 changes speeds, the second ring gear 38 is forced to rotate in an opposite direction as the input pinion 24. The one-way clutch 78 prohibits the second ring gear 38 from rotating in this direction and locks the second ring gear 38.

When the input torque decreases, such as when the trigger switch 18 is de-actuated or when the load on the power tool 2 is removed, the torque spring 66 overcomes the received input torque on the first ring gear 32. The torque spring 66, therefore, forces the cam members 188 of the torque washer 186 into the cam surfaces 96 of the first ring gear 32 to return the first ring gear 32 to its resting position. The guides 102 accordingly guide the control mechanism 160 to engage the lip 158 of the pivot lever 150. Because the spring 88 is biasing the connector 52 to the second position, the pivot lever 150 prohibits the control mechanism 160 from fully reaching the resting position and therefore prohibits the first ring gear 32 from fully rotating to the resting position.

When the trigger switch 18 is released, the trigger spring 182 forces the trigger switch 18 to its resting position and the trigger bar 184 is disengaged thus deactivating the motor 10. The release of the trigger switch 18 also releases the holder spring 180 and the holder 162 may axially move away from the rib 170 of the power tool housing 2. The control mechanism 160 axially moves with the holder 162 along the lip 158 of the pivot lever 150 until the control mechanism 160 axially surpasses the pivot lever 150, at which point the first ring gear 32 may fully rotate to the resting position. The guides 102 therefore may fully guide the control mechanism 160 to the resting position, where control mechanism 160 awaits actuation of the trigger switch 18 to once again pivot the pivot lever 150 and cause the spring 88 to axially move the connector 52 to the first position.

Figure 23:
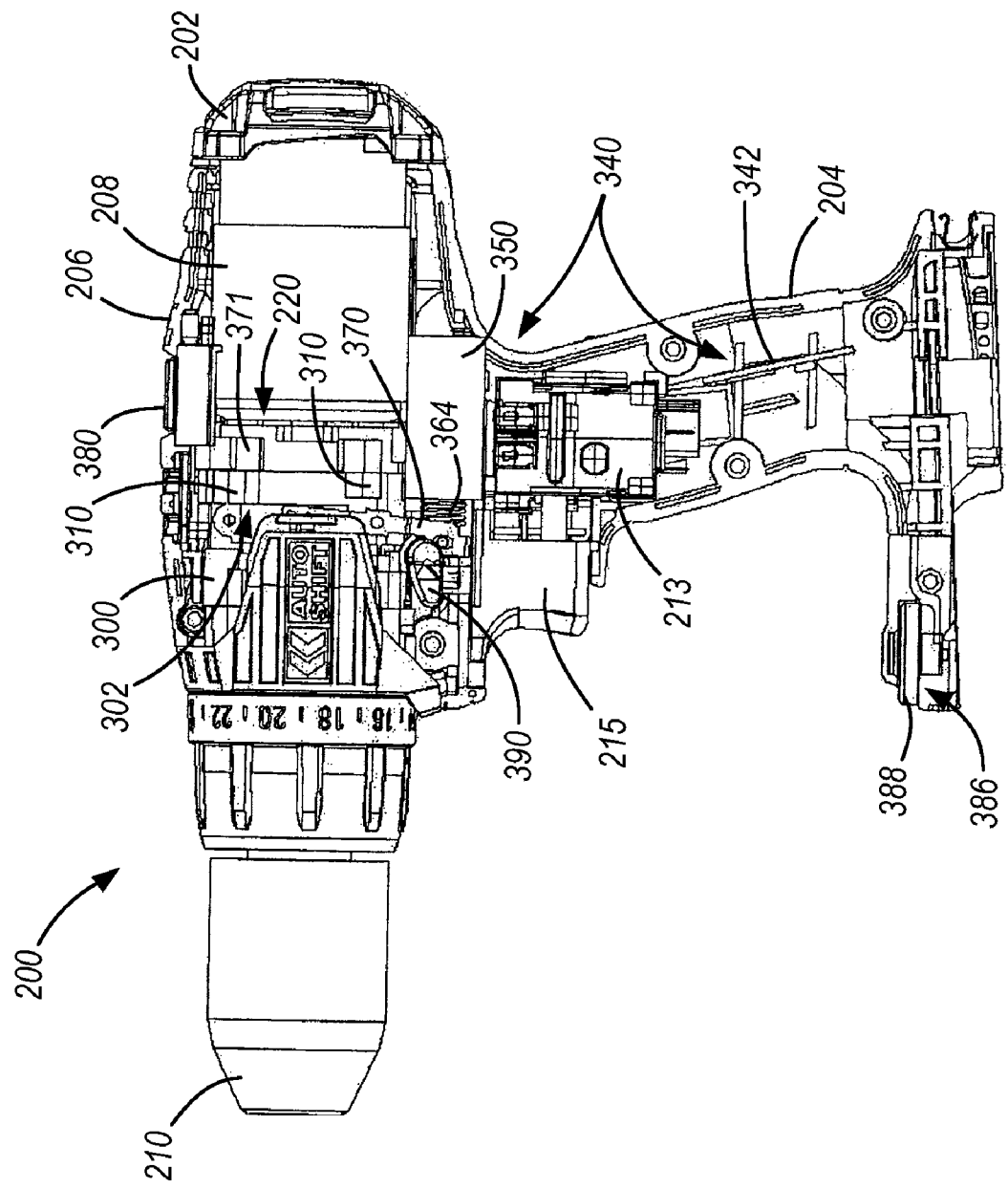
FIG. 23 is a side view of another construction of a power tool including an variable-speed automatic transmission, with portions of the power tool housing removed to better illustrate features of the invention.

With reference to FIG. 23, another embodiment of a power tool 200 is shown. The power tool 200 includes a power tool housing 202 having a handle portion 204 and a drive portion 206. The power tool 200 also includes a motor 208 positioned in the drive portion 206 of the housing 202, a tool output 210 (e.g., a chuck), and a variable-speed automatic transmission 220 operably coupling the motor 208 and the tool output 210. Specifically, the motor 208 includes an output shaft (not shown), the tool output 210 is drivably coupled to a spindle 214 (see FIG. 24), and the transmission 220 is positioned between the output shaft and the spindle 214 to change the speed of the tool output 210 (see FIG. 23). The power tool 200 also includes a trigger 215 and a trigger switch 213 for selectively activating the motor 208. Like the power tool 2 of FIG. 1, the power tool 200 of this embodiment may be powered by an on-board power source (e.g., a body) or an external power source (e.g., household line power via a power cord).

Figure 24:
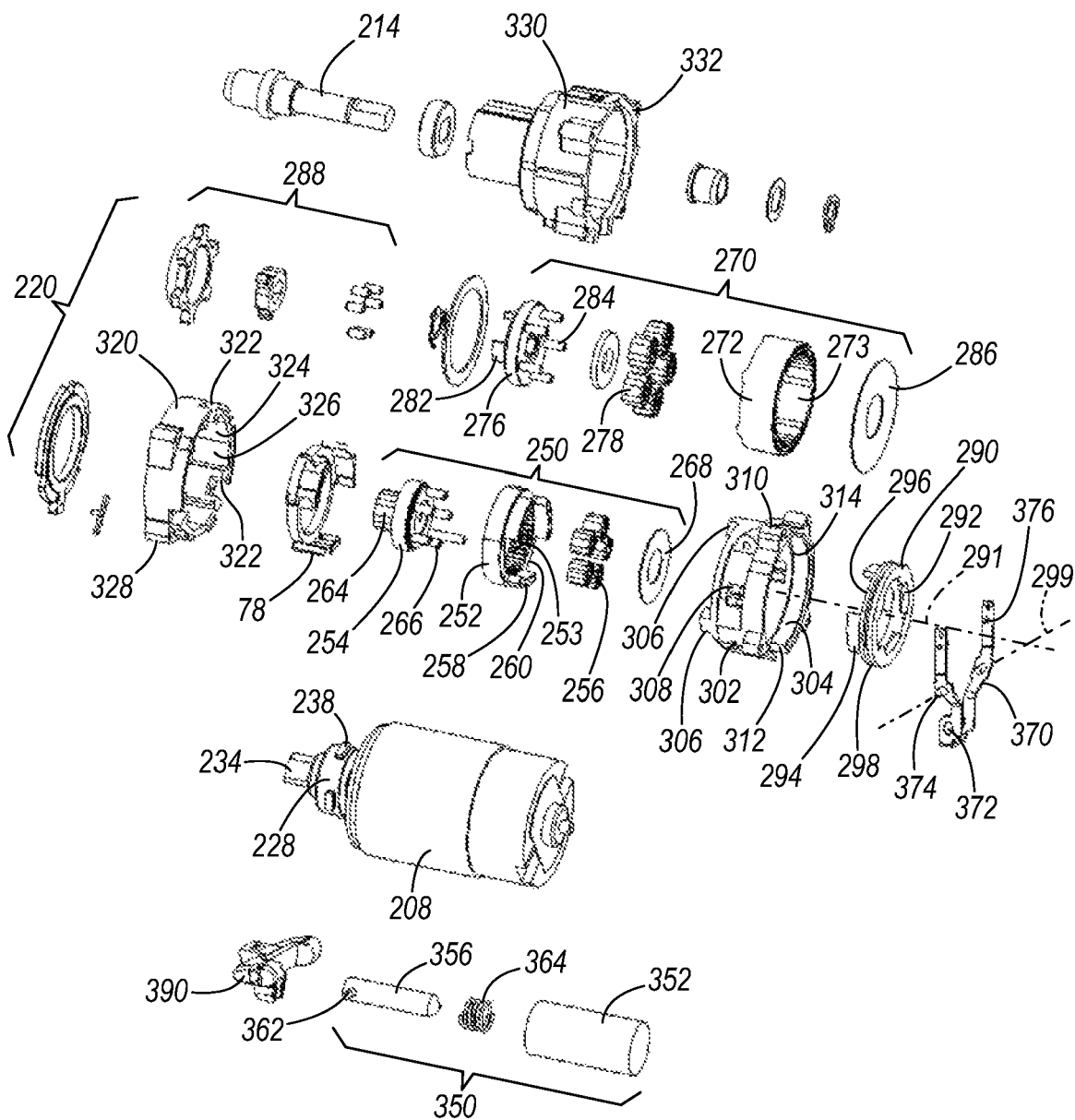
FIG. 24 is an exploded view of the variable-speed automatic transmission of the power tool of FIG. 23.

With continued reference to FIG. 24, the transmission 220 includes a first transmission portion 250 and a second transmission portion 270, each having a planetary geartrain arrangement. The first transmission portion 250 includes a first ring gear 252, a first carrier 254, and first planet gears 256. The second transmission portion 270 includes a second ring gear 272, a second carrier 276, and second planet gears 278. The transmission 220 also includes an annular connector 290 that is axially moveable along an axis 291 relative to the first transmission portion 250 to change the rotational speed of the spindle 214, and therefore the chuck or tool output 210. The transmission 220 further includes a third carrier 228 directly coupled to the motor output shaft for co-rotation with the output shaft. The carrier 228 may be coupled to the motor output shaft in any of a number of different ways (e.g., by using a key and keyway arrangement, an interference fit, a spline-fit, etc.) The carrier 228, with the remainder of the components of the transmission 220, is discussed in greater detail below. Alternatively, the transmission 220 may include more than two stages of gear reduction. For example, an alternative construction of the transmission 220 may include three stages of gear reduction in a similar manner as the transmission 16 of the power tool 2 of FIGS. 1-22.

With reference to FIG. 23, a forward/reverse button 390 on the power tool 200 is operable to set the direction of rotation of the motor 208. When the forward/reverse button 390 is set to a forward output, the motor 208 drives the carrier 228 in a clockwise direction, and when the forward/reverse button 390 is set to a reverse output, the motor 208 drives the carrier 228 in a counter-clockwise direction. When the forward/reverse button 390 is positioned between the forward output position and the reverse output position, the trigger 215 is locked and cannot be depressed, thereby preventing actuation of the trigger switch 213 and activation of the motor 208.

The power tool 200 includes a transmission housing 300 in which the first and second transmission portions 250, 270 are positioned. The transmission housing 300 includes a first housing portion 302, a second housing portion 320, and a third housing portion 330 (FIG. 24). Alternatively, the housing 300 may be a unitary structure. The transmission housing 300 is coupled to the motor 208 via a motor mount 371 (see FIG. 23). Specifically, the first housing portion 302 is coupled to the motor mount 371 via a plurality of fittings 310 on the first housing portion 302 and respective fasteners (e.g., screws; not shown) through the fittings 310. The second housing portion 320 is coupled between the first housing portion 302 and the third housing portion 330. The first housing portion 302 is annular and includes a first chamber 304 at one end and axial flanges 306 extending from the other end. The first housing portion 302 has slots 308 on opposite sides of the housing portion 302, respectively, in which pivot pins 374 on a shift lever 370 are received, as discussed below.

With reference to FIG. 24, the second housing portion 320 is annular and includes a plurality of slots 322, each having a circumferentially-extending arc length configured to receive the respective axial flanges 306 on the first housing portion 302 to rotationally fix the first and second housing portions 302, 320 to each other. A plurality of fasteners (e.g., screws; not shown) are utilized to secure together the first and second housing portions 302, 320. The second housing portion 320 also has a plurality of grooves 324 in the inner circumferential surface 326 that are used in association with a one-way clutch 78, which is discussed in more detail below. The second housing portion 320 also has a plurality of fittings 328 located on the exterior surface to receive fasteners (e.g., screws; not shown) to couple the second housing portion 320 to the third housing portion 330.

The third housing portion 330 is annular and has a plurality of fittings 332 that correspond to the fittings 328 on the second housing portion 320. The fittings 332 couple the second housing portion 320 to the third housing portion 330 via a plurality of fasteners (e.g., screws; not shown). The spindle 214 extends through the third housing portion 330. The motor output shaft and carrier 228 extend into the first housing portion 302.

With continued reference to FIG. 24, the carrier 228 includes a sun gear 234 extending from the front of the carrier 228. The sun gear 234 has teeth that mesh with the first planet gears 256. The carrier 228 has a plurality of projections 238 that extend radially outwardly from the outer circumferential surface of the carrier 228. The projections 238 are selectively positioned within respective recesses or slots 292 in the inner circumferential surface of the connector 290 to rotationally lock the carrier 228 and the connector 290.

The first ring gear 252 is annular and has a plurality of teeth 253 on the inner circumferential surface of the ring gear 252 that mesh with the first planet gears 256. The outer circumferential surface of the ring gear 252 is cylindrical to enable to the first ring gear 252 to rotate within the transmission housing 300. In particular, the first ring gear 252 is rotatable within the second housing portion 320. The first ring gear 252, however, is axially constrained within the transmission housing 300. The first ring gear 252 is coupled to the connector 290 such that the first ring gear 252 and the connector 290 either co-rotate relative to the housing 300 or remain stationary relative to the housing 300. The first ring gear 252 has a plurality of spaced projections 258 defining a corresponding plurality of recesses 260. The projections 258 and recesses 260 are circumferentially-spaced around the first ring gear 252 and extend axially toward the motor 208. The projections 258 are received within corresponding recesses 296 in the connector 290, and projections 294 on the connector 290 are received within the corresponding recesses 260 in the first ring gear 252 to rotationally interlock the first ring gear 252 to the connector 290. Alternatively, any of a number of different features may be utilized to rotationally interlock the first ring gear 252 and the connector 290, yet allow axial movement of the connector 290 with regard to the first ring gear 252.

The first carrier 254 includes a sun gear 264 positioned on the front of the carrier 254 and a plurality of axles 266 extending from the rear of the carrier 254. The sun gear 264 has teeth that mesh with the second planet gears 278, and the first planet gears 256 are rotatably supported on the axles 266. The first planet gears 256 have teeth that mesh with the teeth 253 of the first ring gear 252. The first planet gears 256 also mesh with teeth on the sun gear 234 of the carrier 228. A washer 268 is positioned adjacent the first planet gears 256 to limit axial movement of the first planet gears 256 along the axles 266.

With continued reference to FIG. 24, the second ring gear 272 is annular and has a plurality of teeth 273 on the inner circumferential surface of the ring gear 272 that mesh with the second planet gears 278. The outer circumferential surface of the ring gear 272 is cylindrical to enable the second ring gear 272 to rotate within the transmission housing 300. In particular, the second ring gear 272 is rotatable within the third housing portion 330. The second ring gear 272 is rotatable relative to the third housing portion 330 when the reaction torque applied to the spindle 214 and the second carrier 276 exceeds the pre-set application torque of the power tool 200. Specifically, the rotation of the second carrier 276 is stopped, causing the second ring gear 272 to override a conventional clutch (not shown) between the second ring gear 272 and the third housing portion 330 and begin rotating relative to the housing portion 330.

The second carrier 276 includes a plurality of spindle lock engaging members 282 on the front of the second carrier 276 and a plurality of axles 284 extending from the rear of the carrier 276. The spindle lock engaging members 282 are coupled to an auto spindle lock assembly 288. The auto spindle lock assembly 288 drives the spindle 214 when torque is provided from the second transmission portion 270. The auto spindle lock assembly 288 can lock the spindle 214 from rotation when the driving torque is from the output 210 of the tool 200, and the assembly 288 can release the spindle 214 so that the spindle 214 can rotate when torque is provided from the second transmission portion 270.

The second planet gears 278 are rotatably supported on the axles 284. The second planet gears 278 have teeth that mesh with the teeth 273 of the second ring gear 272. The second planet gears 278 also mesh with teeth on the sun gear 264 of the first carrier 254. A washer 286 is positioned adjacent the second planet gears 278 to limit axial movement of the second planet gears 278 along the axles 284.

With continued reference to FIG. 24, the connector 290 is annular and includes a cylindrical outer surface to enable the connector 290 to rotate within the transmission housing 300. In particular, the connector 290 is rotatable within the first housing portion 302. The connector 290 has a circumferential groove 298 about its outer circumferential surface in which connector pins 376 of the shift lever 370 are received. The connector pins 376 permit the annular connector 290 to rotate freely about the axis 291 when the pins 376 are received within the groove 298. However, the connector pins 376 can also cause the annular connector 290 to move along the axis 291 when the shift lever 370 pivots about a pivot axis 299 extending through the pivot pins 374. As such, pivoting movement of the shift lever 370 about the pivot axis 299 results in axial movement of the connector 290 along the axis 291.

Figure 26:
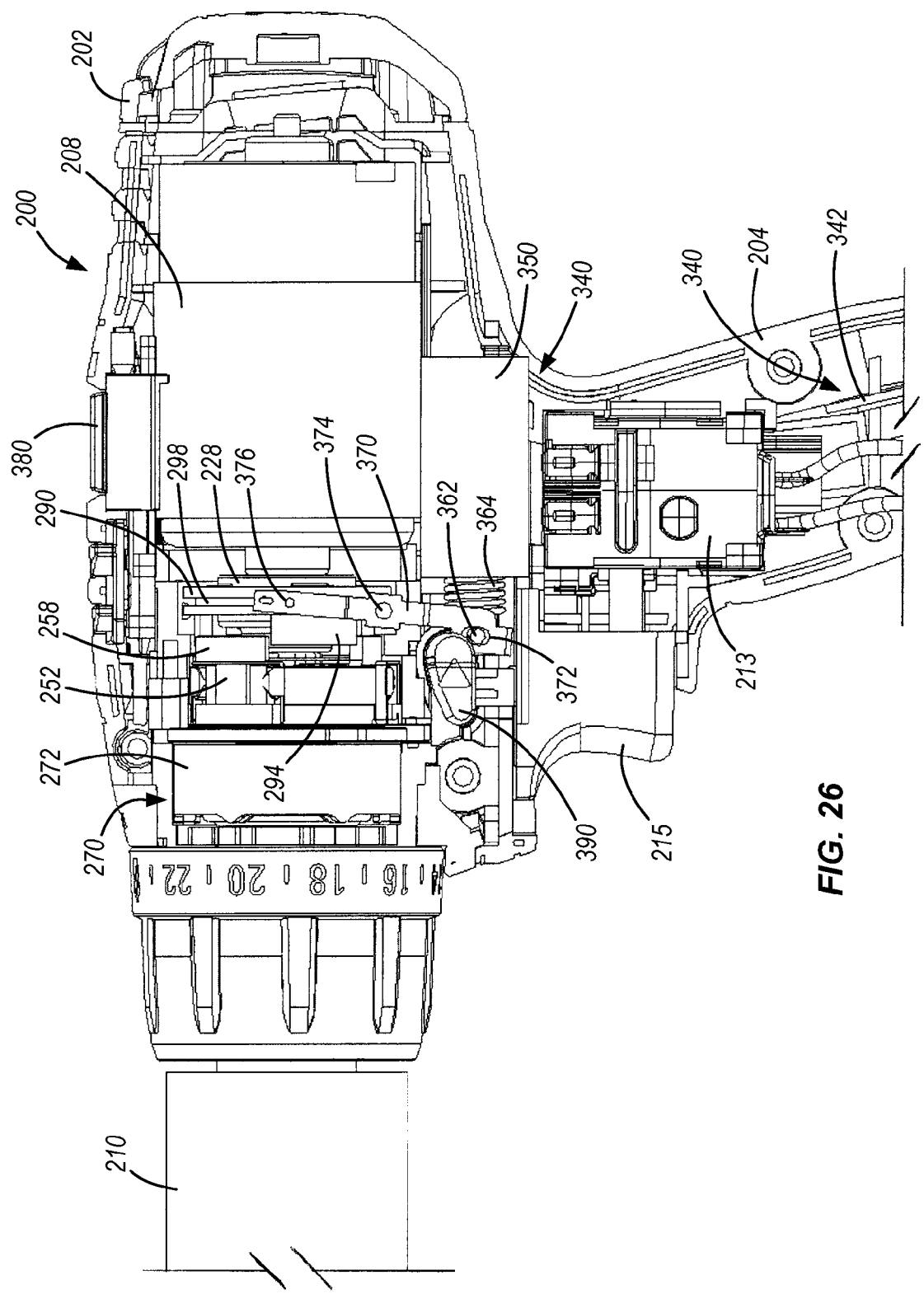
FIG. 26 is an enlarged side view of the power tool of FIG. 23, illustrating the variable-speed automatic transmission in a high-speed low-torque mode.

The connector 290 is axially moveable relative to the first housing portion 302 between a first position, in which the connector 290 co-rotates with the carrier 228, and a second position, in which the connector 290 and first ring gear 252 are stationary relative to the first housing portion 302, and the carrier 228 is rotatable relative to the connector 290 and the first ring gear 252. When the connector 290 is in the first position, the projections 238 are positioned within the respective slots 292 to rotationally interlock the connector 290 to the carrier 228 (FIG. 26). When the connector 290 is in the second position, the projections 238 are positioned outside of the respective slots 292 in the connector 290, such that carrier 228 rotates relative to the connector 290 and first ring gear 252 (see FIG. 27). The range of axial movement of the connector 290 relative to the first ring gear 252 may be limited to ensure that the connector 290 and the first ring gear 252 remain rotationally interlocked when moving between the first and second position.

With reference to FIG. 23, the power tool 200 includes a control mechanism 340 operable to move the connector 290 between the first position and the second position. The control mechanism 340 includes an electronic controller 342 and a solenoid 350 electrically connected to the controller 342 by one more wires (not shown). The controller 342 may be configured to function using hardware only (e.g., a plurality of circuits formed on a printed circuit board) or using software (e.g., hardware in conjunction with a microprocessor).

The solenoid 350 includes a body 352, a plunger 356 received in the body 352, and a return spring 364 positioned around the plunger 356 and abutting the body 352 (FIG. 24). The plunger 356 has a longitudinal axis that is parallel with the longitudinal axis of the motor 208. As shown in FIG. 23, the solenoid 350 is positioned below the motor 208 in the drive portion 206 of the housing 202. The solenoid 350 is configured as a pull-type solenoid 350. The plunger 356 moves axially within the solenoid body 352, against the bias of the return spring 364, as the solenoid 350 is energized and de-energized. Alternatively, the solenoid 350 may be configured as a push-type solenoid. With reference to FIG. 24, the plunger 356 includes a pin 362 extending transversely through the plunger 356. The plunger pin 362 is received within slots 372 provided in the shift lever 370 below the pivot pins 374 such that as the plunger 356 moves axially, the shift lever 370 pivots about the pivot axis 299 and the pivot pins 374 relative to the first housing portion 302.

The return spring 364 is disposed around the plunger 356 and is located between the plunger body 352 and the plunger pin 362. The return spring 364 acts to bias the plunger 356 away from the solenoid body 352. Thus, when the solenoid 350 is de-energized, the end of the plunger 356 having the pin 362 is moved away from the solenoid body 352.

Figure 25:
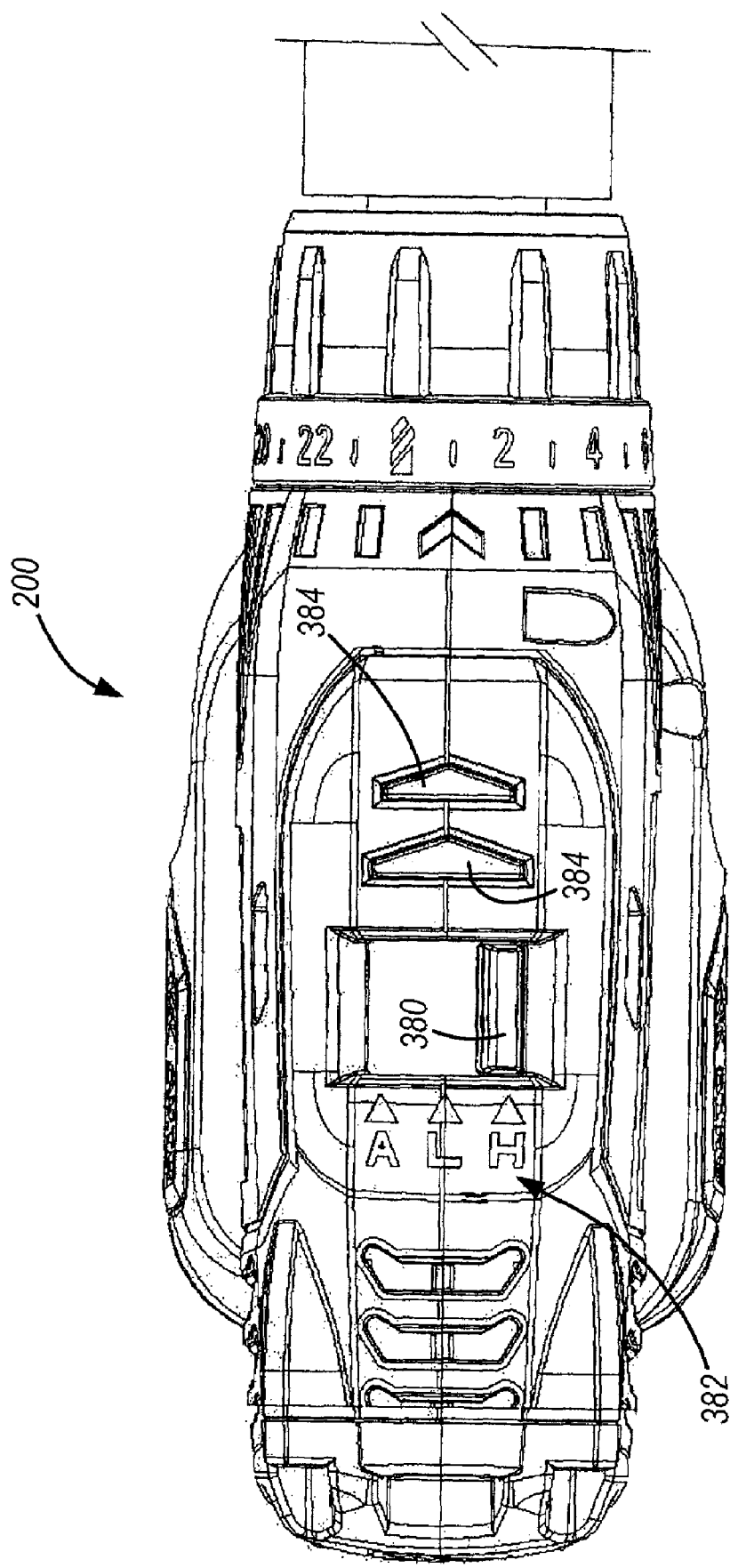
FIG. 25 is a top view of the power tool of FIG. 23.

With reference to FIG. 23, the controller 342 is electrically connected to the solenoid 350 and energizes and de-energizes the solenoid 350. The controller 342 is also electrically connected via one or more wires (not shown) to a mode selector switch 380 (FIG. 25) to set the mode of operation of the transmission 200. As shown in FIG. 25, the mode selector switch 380 is configured as a toggle switch that is manipulated between three positions: a high-speed low-torque mode, a low-speed high-torque mode, and a fully automatic mode. The housing 202 includes indicia 382 adjacent the switch 380 correlating with the mode of operation of the tool 200. In the high-speed low-torque mode, which is indicated with the letter "H," the connector 290 is located in the first position such that the projections 238 on the carrier 228 are received within the slots 292 in the connector 290. In the low-speed high-torque mode, which is indicated with the letter "L," the connector 290 is located in the second position such that the projections 238 on the carrier 228 are positioned outside the slots 292 in the connector 290. In the automatic mode, which is indicated with the letter "A," the connector 290 is movable between the first position and the second position, depending upon a comparison by the controller 342 between the motor operating current and a pre-set or user-determined threshold current. Although the mode selector switch 380 is configured as a toggle switch, alternatively, the mode selector switch 380 may be configured in any of a different number of ways (e.g., a rotatable dial) to allow an operator of the power tool 200 to set the mode of operation of the transmission 220. As shown in FIG. 25, the mode selector switch 380 is positioned on the top portion of the tool housing 202. Alternatively, the mode selector switch 380 may be located anywhere on the tool housing 202. As a further alternative, the mode selector switch 380 may be omitted.

The power tool 200 also includes a plurality of indicators 384 (e.g., LEDs, etc.) that emit one color when the transmission 220 is operating in the high-speed low-torque mode and a different color when the transmission 220 is operating in the low-speed high-torque mode. In this regard, the indicators 384 will change color when the mode selector switch 380 is in the automatic mode, i.e., as the operation of the transmission 220 changes from the high-speed low-torque mode to the low-speed high-torque mode. Alternatively, separate sets of indicators may be utilized when the tool 200 is operating in the high-speed low-torque mode and the low-speed high-torque mode, respectively.

Figure 28:
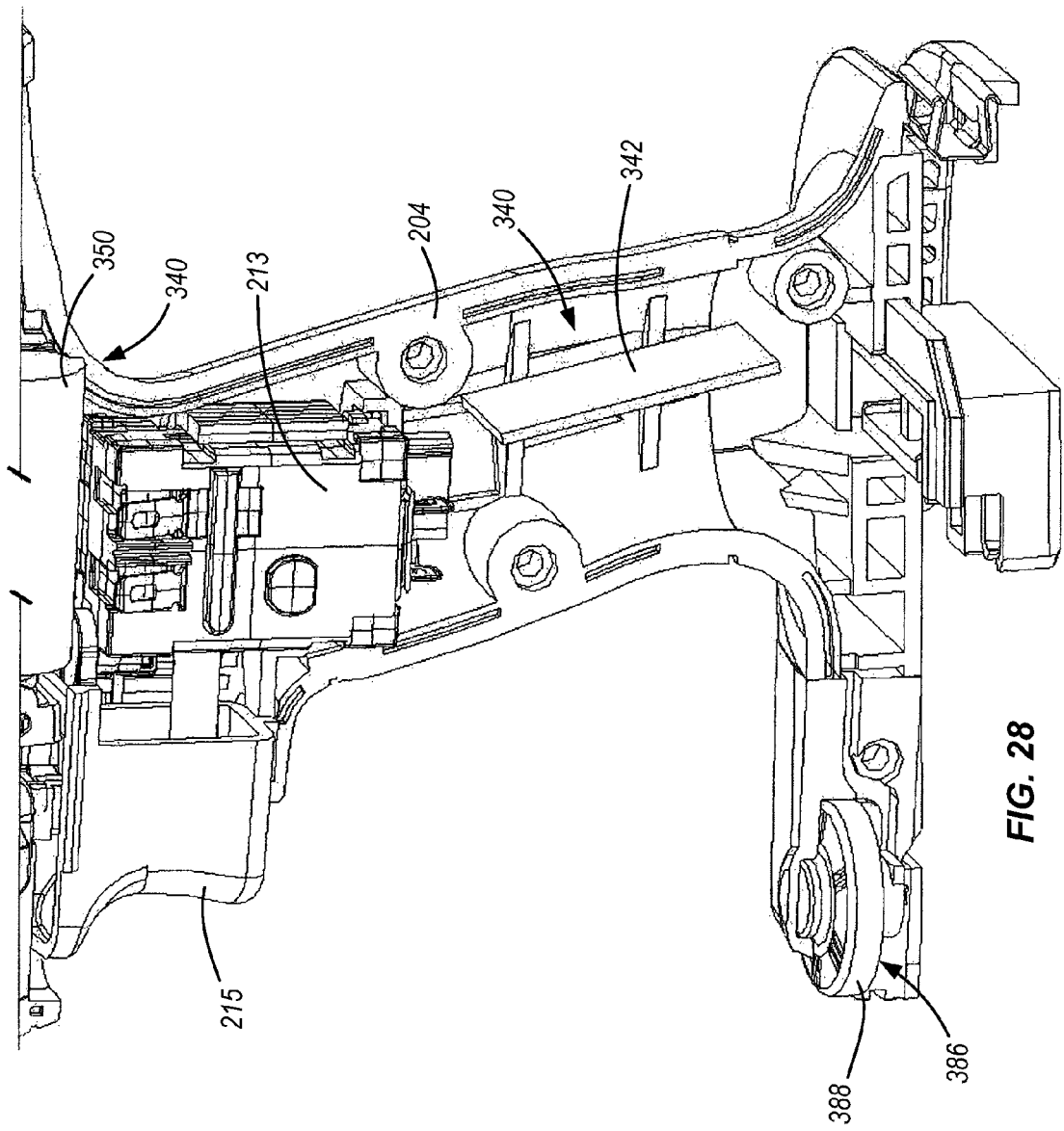
FIG. 28 is an enlarged perspective view of a portion of the power tool of FIG. 23, illustrating an electronic controller and a threshold selector switch.

With reference to FIG. 28, the tool 200 includes a threshold selector switch 386 configured as a variable resistor that is electrically connected via one or more wires (not shown) to the controller 342 to provide a user-selected threshold current to the controller 342 as a reference relative to the operating current of the motor 208. The threshold selector switch 386 includes a dial 388 that is rotatable by an operator of the power tool 200 to set the threshold current provided to the controller 342. Alternatively, the threshold selector switch 386 may be configured in any of a number of different ways (e.g., having a toggle moveable to several discrete positions) to provide the threshold current to the controller 342. Further, the threshold selector switch 386 may be omitted, and the controller 342 may include or be programmed with a pre-set threshold current. The threshold selector switch 386 is provided on the handle portion 204 of the tool 200. The threshold selector switch 386 may be provided on the tool housing 202 at any desirable location.

With reference to FIG. 23, the trigger switch 213 is electrically connected to the controller 342 via one or more wires (not shown) such that as the trigger switch 213 is depressed, the controller 342 and the motor 208 are activated. A trigger spring (not shown) is provided to de-actuate or return the trigger switch 213 to an off position when the user releases the trigger 215.

Figure 27:
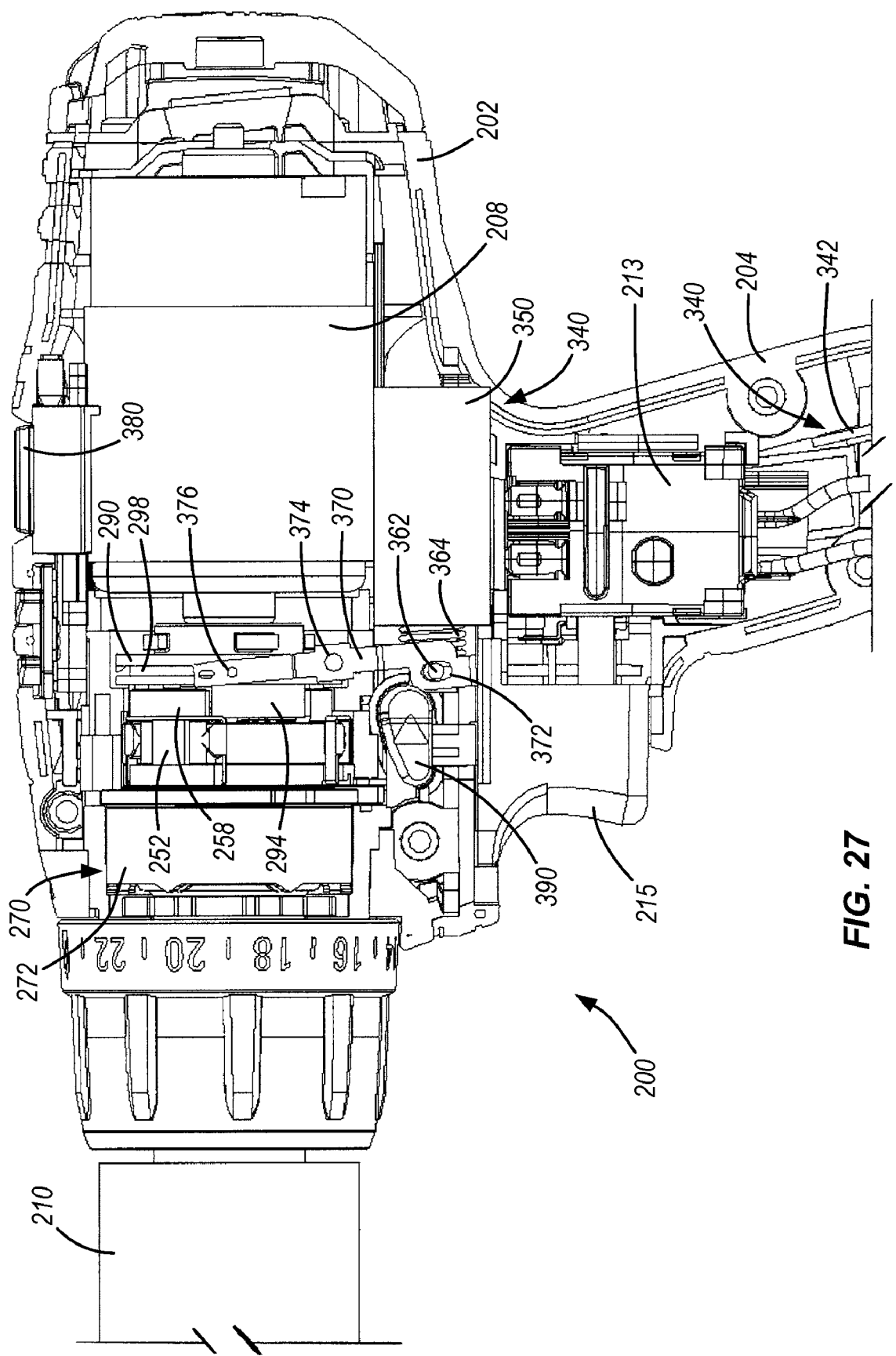
FIG. 27 is an enlarged side view of the power tool of FIG. 23, illustrating the variable-speed automatic transmission in a low-speed high-torque mode.

FIG. 26 illustrates the connector 290 of the transmission 220 in the first position, in which the projections 238 of the carrier 228 are received within the respective slots 292 of the connector 290 to provide a high-speed tool output. This corresponds to the mode selector switch 380 being located in the high-speed low-torque mode or, as discussed below, during operation in the automatic mode when the motor operating current is less than the threshold current. FIG. 27 illustrates the connector 290 of the transmission 220 in the second position, in which the projections 238 of the carrier 228 are removed from the respective slots 292 of the connector 290 to provide a low-speed output. This corresponds to the mode selector switch 380 being located in the low-speed high-torque mode or, as discussed below, during operation in the automatic mode when the motor operating current exceeds the threshold current.

Operation of the variable speed automatic transmission 220 will now be discussed in connection with the flow chart shown in FIG. 29. When the trigger 215 is depressed, the controller 342 and motor 208 are activated. The controller 342 then detects the position of the mode selector switch 380. If the mode selector switch 380 is in the high-speed low-torque mode, the controller 342 will maintain the solenoid 350 in a de-energized state. As a result, the return spring 364 biases the plunger 356 away from the solenoid body 352 such that the plunger 356 biases the shift lever 370 in a clockwise direction about the pivot pins 374 (FIG. 26) to maintain the connector 290 in the first position. In the first position, the connector 290 is rotationally locked with the carrier 228 and therefore co-rotates with the carrier 278. The connector 290 is also rotationally locked with the first ring gear 252, such that the carrier 228, the first ring gear 252, and the connector 290 rotate together at the same speed. The locking of the carrier 228 and the first ring gear 252 also locks the first planet gears 256, which, in turn, rotationally locks the first carrier 254 to rotate with the carrier 228 at the same speed. Thus, when the connector 290 is in the first position, the carrier 228 and the first transmission portion 250 rotate together to produce a high-speed low-torque output. In other words, the second transmission portion 250 is disabled such that only a single stage of speed reduction is utilized by the power tool 200 (i.e., using the second transmission portion 270).

Figure 29:
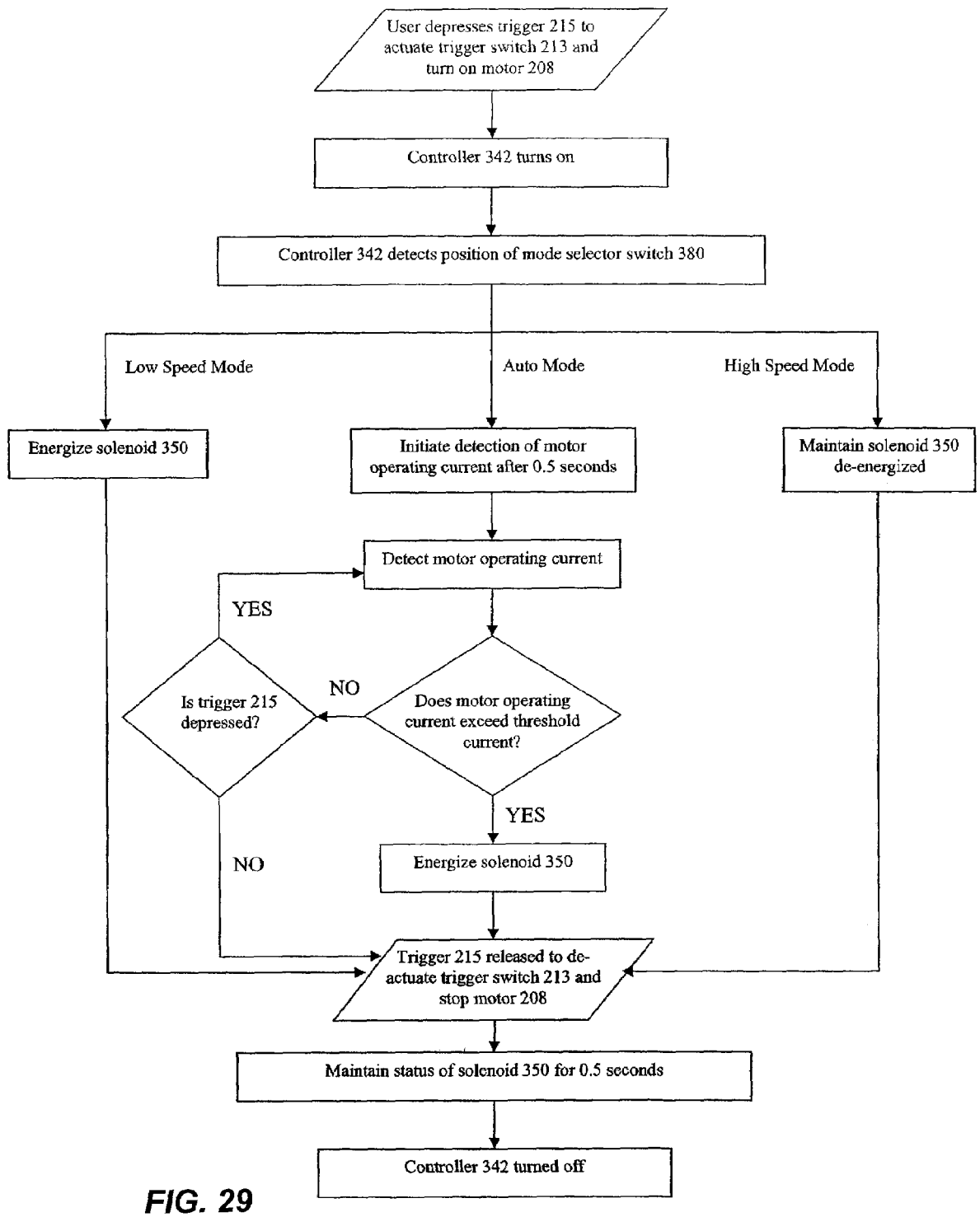
FIG. 29 is a flow chart of a process for controlling the variable-speed automatic transmission of the power tool of FIG. 23.

With reference to FIG. 29, if the controller 342 detects that the mode selector switch 380 is in the low-speed high-torque mode, the controller 342 energizes the solenoid 350 to retract the plunger 356 into the solenoid body 352. When energizing the solenoid 350, the controller 342 initially applies a large voltage (e.g., 16V) to the solenoid 350 for a short period of time (e.g., 0.1 seconds) to retract the plunger 356, then drops the supply voltage to the solenoid 350 to a lower value (e.g., 6V) to maintain the plunger 356 in its retracted position because less force is required to maintain the plunger 356 in its retracted position compared to the force required to retract the plunger.

Retraction of the plunger 356 into the solenoid body 352 causes the shift lever 370 to pivot in a counter-clockwise direction about the pivot pins 374 (FIG. 27). As the shift lever 370 pivots in this direction, the connector 290 is moved axially to the second position. In this position, the projections 238 of the carrier 228 are located outside or are removed from the slots 292 in the connector 290, such that the connector 290 is rotationally unlocked from the carrier 228. Thus, the carrier 228 rotates independently of the connector 290 and the first ring gear 252, driving the first planet gears 256, causing them to orbit the inner circumferential surface of the first ring gear 252. The planet gears 256 impart a reaction torque on the first ring gear 252 in a direction opposite to the direction of rotation of the carrier 228. The one-way clutch 78, however, inhibits the first ring gear 252 from rotating in this direction (FIG. 24). The first ring gear 252, therefore, is rotationally locked by the one-way clutch 78 relative to the housing 202. The one-way clutch 78 allows the first ring gear 252 to rotate in one direction and inhibits the first ring gear 252 from rotating in the opposite direction. The one-way clutch 78 is operably coupled to the forward/reverse button 390 to provide this functionality in both a forward direction and a reverse direction of the tool output or chuck 210.

The sun gear 234 of the carrier 228 then rotates the first planet gears 256 relative to the first ring gear 252, which, in turn, rotates the first carrier 254. The first carrier 254 therefore rotates independently of the carrier 228. The output of the first transmission portion 250 (i.e., the sun gear 264) rotates the second planet gears 278, which, in turn, rotates the second carrier 276. The second carrier 276 rotates the spindle 214. Because the first transmission portion 250 and the carrier 228 rotate independently, the variable transmission 200 produces a low-speed high-torque output.

With reference to FIG. 29, if the mode selector switch 380 is in the automatic mode, the controller 342 initiates an operating current detection sequence for a period of time (e.g., 0.5 seconds) after activation of the motor 208 to avoid the detection of an initial surge current immediately following activation of the motor 208. Alternatively, the controller 342 may initiate the operating current detection sequence immediately following activation of the motor 208 in conjunction with monitoring the rate of change of the motor operating current (i.e., dI/dt). Then, the controller 342 would proceed to the next step in the flow chart only after the rate of change of the motor operating current is less than a predetermined value.

The controller 342 then detects the motor operating current and compares the motor operating current with the threshold current determined by the threshold selector switch 386. If the motor operating current is less than the threshold current, the controller 342 maintains the solenoid 350 in a de-energized state such that the connector 290 remains in the first position engaged with the carrier 228 such that torque received from the motor 208 is not multiplied by the first transmission portion 250 (i.e., no "torque multiplication" by the transmission portion 250 occurs). The controller 342 repeats the detection and comparison sequence so long as the trigger 215 is depressed. If the trigger 215 is released, delivery of power to the motor 208 is stopped and the motor 208 stops. However, if the motor operating current is larger than or exceeds the threshold current, the solenoid 350 is energized to disengage the connector 290 from the carrier 228 to provide the low-speed high-torque tool output such that torque received from the motor 208 is multiplied by the first transmission portion 250 to increase the torque transferred to the second transmission portion (i.e., "torque multiplication" by the transmission portion 250 occurs). If the trigger 215 is released, the motor 208 stops, and the solenoid 350 is maintained in an energized state for a period of time (e.g., 0.5 seconds) prior to the controller 342 turning off.

To change the "shift point" of the power tool 200, the operator of the tool 200 need only to rotate the dial 388 of the threshold selector switch 386. For example, if it is desired to lower the shift point (i.e., decrease the threshold current), the operator would rotate the dial 388 in a first direction. Likewise, if it is desired to raise the shift point (i.e., increase the threshold current), the operator would rotate the dial 388 in the opposite direction. This may be desirable when the operator uses the power tool 200 on a soft or low dense workpiece, then uses the power tool 200 on a harder or more dense workpiece. As such, when switching from the softer workpiece to the harder workpiece, the power tool 200 would shift from the high-speed low-torque mode to the low-speed high-torque mode sooner to increase the amount of torque delivered to the tool output 210 to complete the cutting or drilling operation.

The controller 342 may incorporate analog to digital connector sampling with digital filtering and smoothing to any of the signals provided to the controller 342 or output by the controller 342.

Various features of the invention are set forth in the following claims.

What is claimed is:

1. A transmission assembly powered by an electric motor, the transmission assembly comprising:
   a transmission portion including an outer ring gear;
   a connector moveable relative to the outer ring gear between a first position, in which the connector is rotatable with the transmission portion in response to torque received from the motor, and a second position, in which the connector and the outer ring gear are non-rotatable; and
   a control mechanism operable to detect the operating current of the motor and compare the operating current to a threshold current;
   wherein the control mechanism is operable to move the connector from the first position to the second position in response to the motor operating current exceeding the threshold current; and
   wherein torque multiplication occurs through the transmission portion when the connector is in the second position, and wherein torque multiplication does not occur through the transmission portion when the connector is in the first position.

2. The transmission assembly of claim 1, wherein the control mechanism comprises:
   a controller operable to detect the operating current of the motor and compare the operating current to the threshold current; and
   a solenoid electrically connected to the controller;
   wherein the connector is movable from the first position to the second position in response to one of energizing and de-energizing the solenoid.

3. The transmission assembly of claim 2, wherein the control mechanism includes a mode selector switch electrically connected to the controller and manipulatable between a first position, in which the solenoid is maintained in one of an energized state and a de-energized state regardless of the operating current of the motor, and a second position, in which the solenoid is prompted to change states in response to the motor operating current exceeding the threshold current.

4. The transmission assembly of claim 2, wherein the control mechanism includes a lever coupling the solenoid and the connector.

5. The transmission assembly of claim 4, wherein the connector is movable from the first position to the second position along a first axis, and wherein the lever is pivotable about a second axis that is substantially transverse to the first axis to move the connector from the first position to the second position.

6. The transmission assembly of claim 2, wherein the solenoid includes a spring operable to bias the connector toward one of the first position and the second position when the solenoid is de-energized.

7. The transmission assembly of claim 1, wherein the transmission portion is a planetary transmission portion, wherein the transmission assembly further includes a carrier operable to transfer torque from the motor to the planetary transmission portion, wherein the carrier, the connector, and the outer ring gear co-rotate when the connector is in the first position, and wherein the carrier is rotatable relative to the connector and the outer ring gear when the connector is in the second position.

8. The transmission assembly of claim 7, wherein the carrier includes one of a projection and a slot, wherein the connector includes the other of the projection and the slot, wherein the projection is received within the slot when the connector is in the first position, and wherein the projection is removed from the slot when the connector is in the second position.

9. The transmission assembly of claim 7, wherein the outer ring gear includes one of a projection and a slot, wherein the connector includes the other of the projection and the slot, wherein the projection is received within the slot when the connector is in the first position and the second position.

10. The transmission assembly of claim 1, further comprising a one-way clutch operable to prevent rotation of the outer ring gear and the connector when the connector is in the second position.

11. The transmission assembly of claim 1, wherein the control mechanism comprises:
    a controller operable to detect the operating current of the motor and compare the operating current to the threshold current; and
    a threshold selector switch electrically connected to the controller and operable to vary the threshold current.

12. The transmission assembly of claim 1, wherein the control mechanism is operable in one of a first mode, in which torque multiplication does not occur through the transmission portion, a second mode, in which torque multiplication occurs through the transmission portion, and a third mode, in which torque multiplication does not occur through the transmission portion when the motor operating current is less than the threshold current, and in which torque multiplication occurs through the transmission portion when the motor operating current exceeds the threshold current.

13. A transmission assembly powered by an electric motor, the transmission assembly comprising:
    a transmission portion operable to receive torque from the motor; and
    a control mechanism coupled to the transmission portion and operable to detect the operating current of the motor and compare the operating current to a threshold current;
    wherein the control mechanism is operable in one of a first mode, in which torque multiplication does not occur through the transmission portion, a second mode, in which torque multiplication occurs through the transmission portion, and a third mode, in which torque multiplication does not occur through the transmission portion when the motor operating current is less than the threshold current, and in which torque multiplication occurs through the transmission portion when the motor operating current exceeds the threshold current;
wherein the transmission portion includes an outer ring gear;
wherein the transmission assembly further includes a connector moveable relative to the outer ring gear between a first position, in which the connector is rotatable with the outer ring gear in response to torque received from the motor, and a second position, in which the connector and the outer ring gear are non-rotatable; and
wherein torque multiplication occurs through the transmission portion when the connector is in the second position, and wherein torque multiplication does not occur through the transmission portion when the connector is in the first position.

14. The transmission assembly of claim 13, wherein the control mechanism is operable to move the connector from the first position to the second position in response to the motor operating current exceeding the threshold current.

15. The transmission assembly of claim 13, wherein the control mechanism comprises:
a controller operable to detect the operating current of the motor and compare the operating current to the threshold current; and
a solenoid electrically connected to the controller;
wherein the connector is movable from the first position to the second position in response to one of energizing and de-energizing the solenoid.

16. The transmission assembly of claim 15, wherein the control mechanism includes a mode selector switch electrically connected to the controller and manipulatable between a first position, in which the solenoid is maintained in one of an energized state and a de-energized state regardless of the operating current of the motor, a second position, in which the solenoid is maintained in the other of the energized state and the de-energized state regardless of the operating current of the motor, and a third position, in which the solenoid is prompted to change states in response to the motor operating current exceeding the threshold current.

17. The transmission assembly of claim 15, wherein the control mechanism includes a lever coupling the solenoid and the connector.

18. The transmission assembly of claim 17, wherein the connector is movable from the first position to the second position along a first axis, and wherein the lever is pivotable about a second axis that is substantially transverse to the first axis to move the connector from the first position to the second position.

19. The transmission assembly of claim 15, wherein the solenoid includes a spring operable to bias the connector toward one of the first position and the second position when the solenoid is de-energized.

20. The transmission assembly of claim 13, wherein the transmission portion is a planetary transmission portion, wherein the transmission assembly further includes carrier operable to transfer torque from the motor to the planetary transmission portion, wherein the carrier, the connector, and the outer ring gear co-rotate when the connector is in the first position, and wherein the carrier is rotatable relative to the connector and the outer ring gear when the connector is in the second position.

21. The transmission assembly of claim 20, wherein the carrier includes one of a projection and a slot, wherein the connector includes the other of the projection and the slot, wherein the projection is received within the slot when the connector is in the first position, and wherein the projection is removed from the slot when the connector is in the second position.

22. The transmission assembly of claim 13, wherein the outer ring includes one of a projection and a slot, wherein the connector includes the other of the projection and the slot, wherein the projection is received within the slot when the connector is in the first position and the second position.

23. The transmission assembly of claim 13, further comprising a one-way clutch operable to prevent rotation of the outer ring gear and the connector when the connector is in the second position.

24. The transmission assembly of claim 13, wherein the control mechanism includes
a controller operable to detect the operating current of the motor and compare the operating current to the threshold current; and
a threshold selector switch electrically connected to the controller and operable to vary the threshold current.

* * * * *